US008825314B2

(12) United States Patent
Jensen

(10) Patent No.: US 8,825,314 B2
(45) Date of Patent: Sep. 2, 2014

(54) WORK MACHINE DRIVE TRAIN TORQUE VECTORING

(75) Inventor: Jeffery Edward Jensen, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 66 days.

(21) Appl. No.: 13/563,315

(22) Filed: Jul. 31, 2012

(65) Prior Publication Data

US 2014/0039767 A1    Feb. 6, 2014

(51) Int. Cl.
*G06G 7/70* (2006.01)
*B60K 17/348* (2006.01)

(52) U.S. Cl.
USPC .................. 701/50; 180/248; 180/76; 701/81

(58) Field of Classification Search
USPC ..................... 701/50, 69, 81, 87–89; 280/5.5; 180/4.09, 76, 197, 248–250, 29; 477/36, 97, 900, 902
See application file for complete search history.

(56) References Cited

U.S. PATENT DOCUMENTS

| 4,462,271 | A |   | 7/1984  | Stieg |
|-----------|---|---|---------|-------|
| 5,178,231 | A | * | 1/1993  | Watanabe et al. ............. 180/248 |
| 5,208,755 | A | * | 5/1993  | Tezuka ............................. 701/88 |
| 5,332,059 | A | * | 7/1994  | Shirakawa et al. ........... 180/197 |
| 5,461,568 | A | * | 10/1995 | Morita ............................. 701/88 |
| 5,802,489 | A |   | 9/1998  | Orbach et al. |
| 6,085,138 | A |   | 7/2000  | Smith et al. |
| 6,189,643 | B1 | * | 2/2001 | Takahashi et al. ............. 180/248 |
| 6,336,069 | B1 |   | 1/2002 | Hasegawa et al. |
| 6,434,469 | B1 | * | 8/2002 | Shimizu et al. .................. 701/84 |
| 6,631,773 | B1 |   | 10/2003 | Walker |
| 6,697,725 | B1 |   | 2/2004 | Williams |
| 6,698,541 | B2 |   | 3/2004 | Sakakiyama |
| 6,810,318 | B2 |   | 10/2004 | Brooks et al. |

(Continued)

FOREIGN PATENT DOCUMENTS

| GB | 2 358 163 A | 12/2000 | |
|----|-------------|---------|---|
| JP | 63002731 A | * 1/1988 | ............. B60K 17/35 |
| JP | 9076779 A | 3/1997 | |
| WO | WO 2007112718 A1 | * 10/2007 | ............. G01G 19/10 |

OTHER PUBLICATIONS

Wikipedia; *Torque Vectoring*; internet article; May 2, 2012; 3 pages; http://en.wikipedia.org/wiki/Torque_Vectoring.

(Continued)

*Primary Examiner* — Mary Cheung
*Assistant Examiner* — Rodney Butler
(74) *Attorney, Agent, or Firm* — Miller, Matthias & Hull

(57) ABSTRACT

A machine may include a powertrain drivingly connected to left and right front and rear wheels through a torque transfer unit to transfer torque to the front wheels as a function of a desired front torque and to the rear wheels as a function of a desired rear torque. At least one sensor of the machine may detect a value of an operating parameter indicative of a weight distribution of the machine across the wheels, and generate a parameter signal corresponding to the operating parameter. A control unit determines the weight distribution across the wheels as a function of the parameter signal, and the desired front and rear torques as a function of the weight distribution. The control unit also considers the weight and position of a load of material borne by an implement of the machine in determining the weight distribution.

18 Claims, 12 Drawing Sheets

(56) References Cited

U.S. PATENT DOCUMENTS

| | | |
|---|---|---|
| 7,294,083 B2 | 11/2007 | Bowen |
| 7,334,670 B2 | 2/2008 | Namuduri et al. |
| 7,491,147 B2 | 2/2009 | Ross |
| 7,979,188 B2 | 7/2011 | Burkhart et al. |
| 8,065,875 B2 * | 11/2011 | Vigholm et al. .......... 60/469 |
| 2002/0087252 A1 * | 7/2002 | Shimizu et al. ............ 701/84 |
| 2007/0129871 A1 | 6/2007 | Post, II et al. |
| 2008/0242502 A1 * | 10/2008 | Lin ............................. 477/80 |
| 2009/0005939 A1 * | 1/2009 | Dueckinghaus et al. ....... 701/50 |
| 2010/0106354 A1 | 4/2010 | Fauvel et al. |
| 2010/0250049 A1 | 9/2010 | Nihei et al. |
| 2010/0312447 A1 * | 12/2010 | Perkins ....................... 701/71 |
| 2012/0323420 A1 * | 12/2012 | Koike et al. ................. 701/22 |

OTHER PUBLICATIONS

Popular Mechanics; *Torque Vectoring; The Hyper-Smart, Fuel-Efficient Future of All-Wheel Drive*; magazine; Oct. 1, 2009; 6 pages; http://www.popularmechanics.com/cars/news/4225886.

Burgess, Malcolm; *Torque Vectoring; article*; 4 pages.

Wikipedia; *Differential (mechanical device)*; internet article; May 2, 2012; 11 pages; http://en.wikipedia.org/wiki/Differential_(mechanical device).

Caterpillar; *725 Articulated Truck*; article; 2011; 20 pages.

* cited by examiner

WORK MACHINE DRIVE TRAIN TORQUE VECTORING

TECHNICAL FIELD

This disclosure relates generally to machines for hauling material and, in particular, to drive trains in such machines distributing torque to the wheels of the machine based on a weight distribution of a load, the speed and direction of the machine, and the terrain over which the machine is driven.

BACKGROUND

Wheel loaders, rigid frame and articulated dump trucks and other machines known in the art are used for moving material from one place to another at a worksite. In loading and moving the work material, these work machines are subjected to varying load conditions and weight distributions caused by the movement and positioning of the components of the machine and the load of material being hauled. In a static or non-moving state, the weight distribution of a work machine, such as for example a wheeled front end loader, is affected by component geometry characteristics, including tire radius and tire pressure, payload mass and position, weights and centers of gravity of the frames, axles, front linkage and implements, as well as optional attachments and their corresponding masses and centers of gravity. The weight distribution is also affected by surface grade and slope that change the orientation of the work machine. In a dynamic state such as when performing work cycles, the weight distribution of the work machine may also be affected by movement of the machine with forward and reverse acceleration and deceleration, at a steering angle and steering rate, and of a front linkage to manipulate the work implement.

In a typical work cycle of a wheel loader, the operator causes the wheel loader to approach a wall or pile of work material, lowers the front linkage and implement, such as a bucket, to ground level and drives the bucket into the work material. As the wheel loader drives into the pile, the wheel loader's forward speed slows down to a stop as the bucket is lifted and tilted to fill the bucket with a load of work material. After sufficiently loading the bucket, the operator reverses the direction of the wheel loader and accelerates out of the pile, typically while turning in the direction that points the front end of the wheel loader toward the destination for unloading the work material, such as at another pile or in the bed of a dump truck. The operator stops the machine, reverses direction and steers and accelerates forward to the dumping location. Where the load of work material is unloaded into a dump truck or hopper, the operator lifts the bucket as the wheel loader is approaching the dump location and stops the wheel loader while tilting the bucket downward to dump the load. The operator will then reverse the direction of the wheel loader and back away from the dump location, turn and acceleration forward toward the work material and repeat the digging process.

In general, work machines such as the described wheel loader are designed to balance the varying weight distributions across the wheels so that the work machine maintains stability during the work cycle. For example, a load of work material at the front of the wheel loader may be balanced by a counterweight in the rear. However, the locations of the centers of gravity of the bucket and linkage as well as the load of material change during the work cycle depending on the position of the linkage arms and the steering position and rate of the wheel loader. Aggressive digging or overloading of the bucket can cause the rear axle to lift partially or completely off of the ground. Quick accelerations, decelerations, steering maneuvers at high speeds or with heavy loads as well as operation on steep grades or slopes can significantly transfer weight to one side or one corner of the machine, thereby reducing the reactant force between the ground and the lightly loaded wheels. In some situations, the torque provided to the lightly loaded wheels may be sufficient to cause the wheels to slip and thereby waste power from the drive train that could be utilized to drive the work machine over the ground.

Mechanical systems have been developed for transferring torque from a sliding wheel to a non-sliding wheel in various vehicles. For example, limited slip differentials include gears that engage when one wheel loses traction and spins to transfer all the torque to the high traction wheel. Electro-mechanical slip limiting systems are known that stop the slipping wheel so that torque can be transferred to the high traction wheel. For example, in some automotive applications having open differentials and anti-lock braking systems, the brakes may be applied to limit or stop the slippage of the low traction wheel so that the open differential transfers the torque to the high traction wheel. The automotive industry has also introduced torque vectoring differentials having the ability to independently vary the torque being sent to each wheel. Automobiles, however, provide relatively consistent weight distributions since the weights of the passengers are in a known location and are relatively small relative to the vehicle weight. In contrast, work machines are subject to loads created by work material having a greater affect on the weight distribution across the wheels of the work machine and that move during the execution of a work cycle performed by the work machine.

One example of a torque distribution strategy is provided in U.K. Patent Appl. No. GB 2 358 163 A, published for Ranson et al. on Jul. 18, 2001, and entitled, "A Motor Vehicle with Controllable Drive Torque Distribution between Each of Its Driven Wheels Responding to Vehicle Load." The Ranson et al. publication teaches a motor vehicle including load measuring means for each of its wheels and independent drive motors for each of its wheels. A control unit continually monitors the load on each of the wheels and distributes the drive torque accordingly, the wheels with the highest load being supplied with the highest drive torque. The load distribution is also measured before the vehicle starts moving so that the torque distribution can be optimally determined as soon as the vehicle starts off. Measuring loads independently at each wheel of the vehicle likely entails adding components and cost to the vehicle for performing the measurements in work machines designed for hauling loads of work material of varying size and location at a work site.

Therefore, a need exists for an improved method for determining weight distribution and operating conditions for a work machine that is subjected to loads having varying weights and positions while moving work material, and for managing the distribution of torque from a powertrain of the work machine between the wheels of the work machine in response to the determined weight distribution to improve the efficiency of the operation of the work machine, and to maintain stability and safety during use of the work machine.

SUMMARY OF THE DISCLOSURE

In one aspect of the present disclosure, a machine is disclosed. The machine may include a powertrain drivingly connected to at least one left front wheel, at least one right front wheel, at least one left rear wheel, and at least one right rear wheel through a torque transfer unit, the torque transfer unit configured to transfer torque to the front wheels as a function of a desired front torque, and to transfer a different torque to the rear wheels as a function of a desired rear torque. The machine may further include at least one sensor configured to detect a value of an operating parameter of the machine that is indicative of a distribution of a weight of the machine across the left and right front and rear wheels of the machine, and to generate a parameter signal corresponding to the value of the operating parameter. The machine may also include a control unit configured to determine the weight distribution of the machine across the left and right front and rear wheels of the machine as a function of the parameter signal and to determine the desired front torque and the desired rear torque as a function of the weight distribution.

In another aspect of the present disclosure, a method for distributing a powertrain drive torque from a powertrain of a machine to left and right front and rear wheels of the machine based on a distribution of a weight of the machine across the left and right front and rear wheels is disclosed. The method may include detecting a value of an operating parameter of the machine that is indicative of the distribution of the weight of the machine across the left and right front and rear wheels of the machine, and determining the distribution of the weight of the machine across the left and right front and rear wheels of the machine based on the value of the operating parameter. The method may also include distributing the powertrain drive torque from the powertrain of the machine between the front wheels and the rear wheels of the machine based on the distribution of the weight of the machine, with a portion of the powertrain drive torque transmitted to the front wheels being greater than a portion of the powertrain drive torque transmitted to the rear wheels if a portion of the weight of the machine over the front wheels is greater than a portion of the weight of the machine over the rear wheels, and with the portion of the powertrain drive torque transmitted to the rear wheels being greater than the portion of the powertrain drive torque transmitted to the front wheels if the portion of the weight of the machine over the rear wheels is greater than the portion of the weight of the machine over the front wheels.

In a further aspect of the present disclosure, a machine for transporting a load of material is disclosed. The machine may include a left and right front and rear wheels, a powertrain operatively connected to the left and right front and rear wheels, with the powertrain operable for generating a powertrain drive torque and outputting the powertrain drive torque to the left and right front and rear wheels, and at least one sensor for detecting a value of an operating parameter of the machine that is indicative of a distribution of a weight of the machine across the left and right front and rear wheels of the machine, and for outputting a sensor signal corresponding to the value of the operating parameter. The machine may also include a control unit operatively connected to the powertrain and the at least one sensor, and the control unit may be configured to receive the sensor signal from the at least one sensor, and to determine the distribution of the weight of the machine across the left and right front and rear wheels of the machine based on the value of the operating parameter in the sensor signal. The control unit may further be configured to transmit a torque distribution signal to the powertrain to cause the powertrain to output the powertrain drive torque to the left and right front and rear wheels, with a portion of the powertrain drive torque transmitted to the front wheels being greater than a portion of the powertrain drive torque transmitted to the rear wheels if a portion of the weight of the machine over the front wheels is greater than a portion of the weight of the machine over the rear wheels, and with the portion of the powertrain drive torque transmitted to the rear wheels being greater than the portion of the powertrain drive torque transmitted to the front wheels if the portion of the weight of the machine over the rear wheels is greater than the portion of the weight of the machine over the front wheels.

Additional aspects are defined by the claims of this patent.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
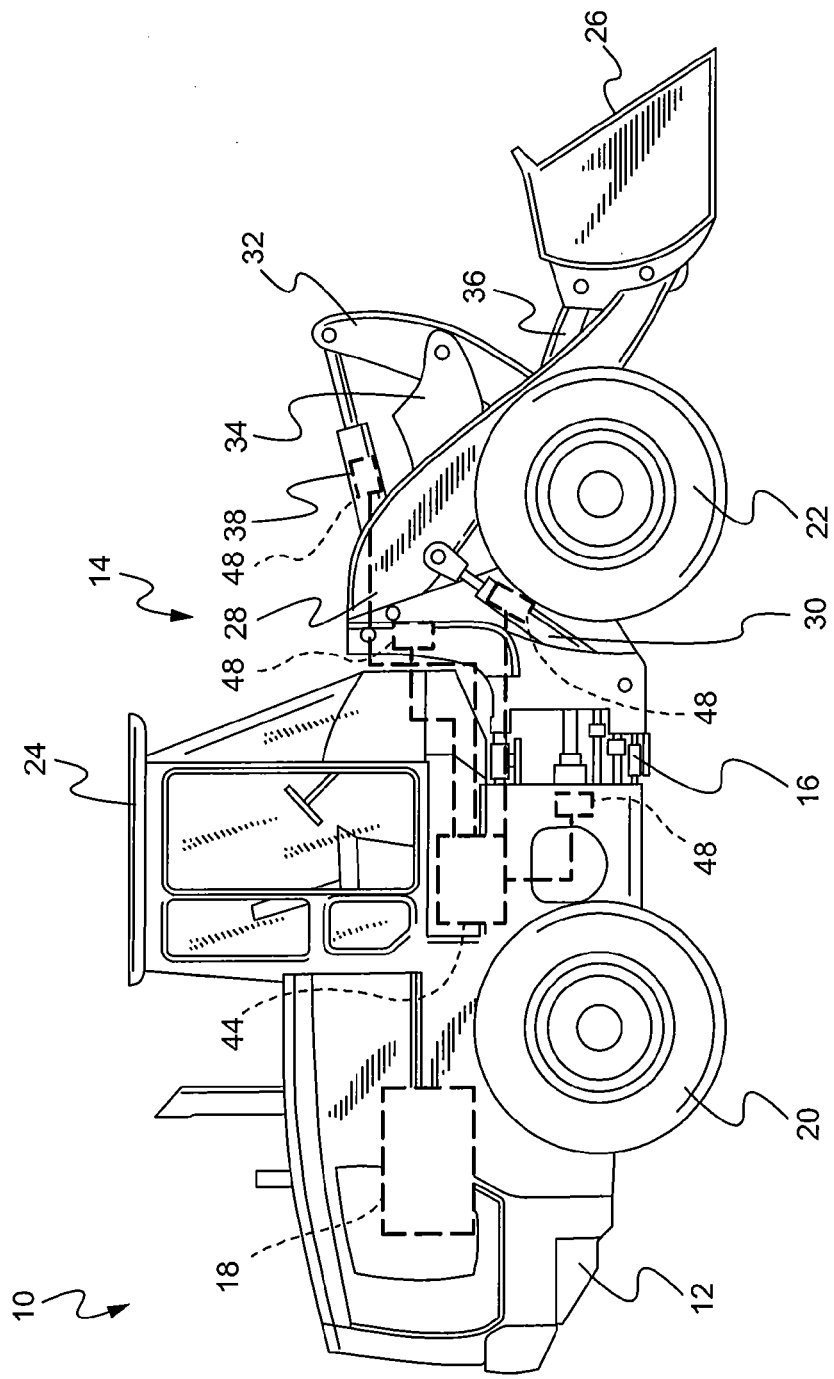
FIG. 1 is a side elevation view of a wheel loader machine in accordance with the present disclosure.

FIG. 1 illustrates an embodiment of a wheel loader 10 in accordance with the present disclosure. The wheel loader 10 includes a body portion 12 and a non-engine end frame 14 connected by an articulating joint 16. The body portion 12 houses a powertrain 18 including an engine and transmission that drive rear wheels 20 and front wheels 22, and includes an operator station such as elevated cab 24 for the operator. The powertrain 18 may refer to just the engine and transmission, or may refer to additional elements transmitting the power of the engine to the wheels 20, 22, such as torque transfer units, drive shafts, differentials, axles and the like. The end frame 14 includes the front wheels 22 that are turned by the steering mechanism, with the articulating joint 16 allowing the end frame 14 to move from side-to-side to turn the wheel loader 10. An implement in the form of a bucket 26 is connected to the end frame 14 by a pair of lift arms 28. One end of each lift arm 28 is pivotally connected to the end frame 14 and the other end is pivotally connected to the bucket 26 proximate the bottom. The lift arms 28 rotate about the point of connection to the end frame 14, with the rotation of the lift arms 28 being controlled by corresponding lift actuators or cylinders 30 pivotally coupled to the end frame 14 and the lift arms 28. The lift cylinders 30 may be extended to raise the lift arms 28 and retracted to lower the lift arms 28. In typical implementations, two lift arms 28 are provided, with each having a corresponding lift cylinder 30. However, a single lift arm 28 and lift cylinder 30, two lift arms 28 driven by a single lift cylinder 30, or other arrangements of lift arms 28 and lift cylinders 30 providing similar functionality as kinematic elements may be implemented.

The rotation of the bucket 26 may be controlled by a linkage of the end frame 14. The linkage may include a tilt lever 32 pivotally connected to a tilt lever support 34 mounted on the lift arms 28 such that the tilt lever support 34 moves with the lift arms 28. At one end of the tilt lever 32, a tilt link 36 has one end pivotally connected to the end of the tilt lever 32, and the opposite end pivotally connected to the bucket 26 proximate the top. A tilt actuator or cylinder 38 couples the opposite end of the tilt lever 32 to the end frame 14 with pivotal connections at either end. For a given position of the lift arms 28, the bucket 26 is rotated toward the racked position by extending the tilt cylinder 38, and rotated in the opposite direction toward the dump position by retracting the tilt cylinder 38.

The wheel loader 10 may further include an electronic control unit 44 receiving commands from implement, steering and braking controls (not shown) in the cab 24 of the wheel loader 10. As the operator manipulates the controls, the electronic control unit (ECU) 44 in response controls the powertrain 18 to drive the wheel loader 10 over a surface, and operably controls actuators that can change the elevation and orientation of the bucket 26 to perform the necessary excavation of the work material. The ECU 44 may also be operatively connected to a plurality of sensors 48 that provide feedback to the electronic control unit 44 regarding the operation of the components of the wheel loader 10 and the operating conditions in and around the machine 10.

Figure 2:
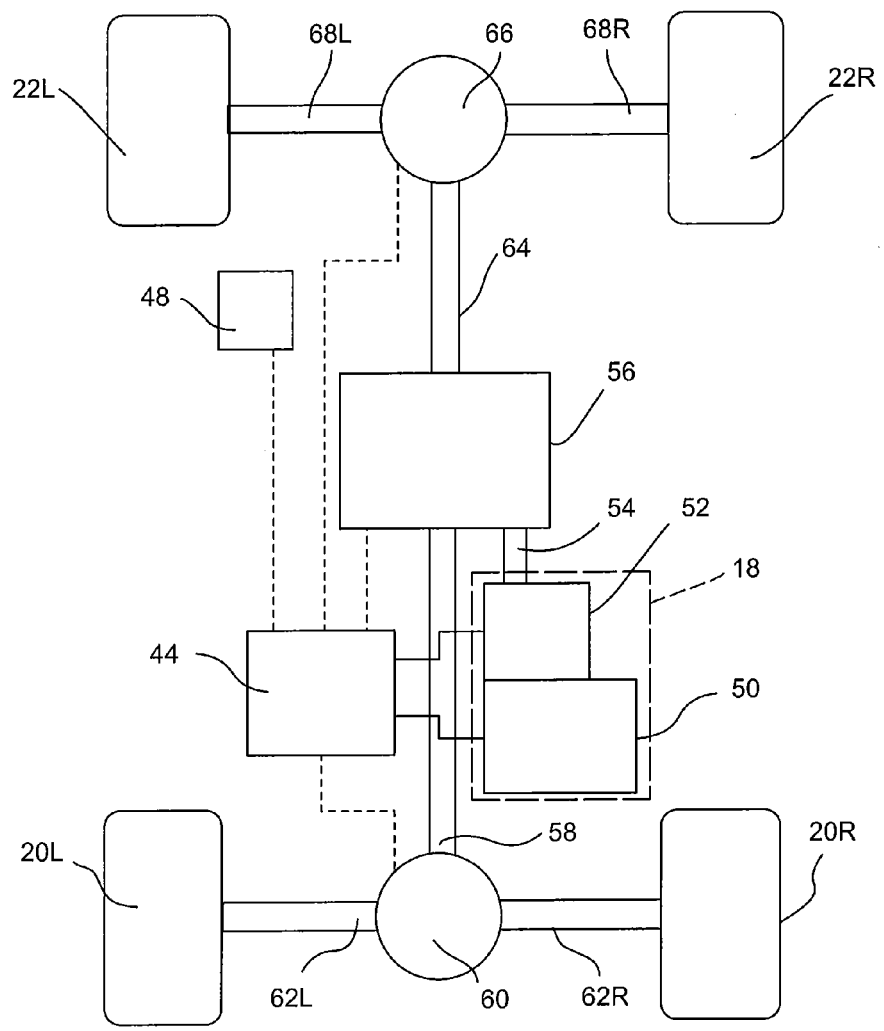
FIG. 2 is a schematic view of the power transmission and drive elements of the wheel loader machine of FIG. 1.

The wheel loader 10 may be all-wheel drive, with the powertrain 18 driving the rear wheels 20 and the front wheels 22 to provide stability as the machine 10 is operated to move work material. FIG. 2 is a schematic illustration of an exemplary combination of the drive components of the wheel loader 10. The powertrain 18 includes an engine 50 and a transmission 52. A drive shaft 54 connects the transmission 52 to a torque transfer unit 56 that distributes torque from the powertrain 18 between the rear wheels 20L, 20R at a desired rear torque and the front wheels 22L, 22R at a desired front torque. As discussed further below, the values of the desired front and rear torques may or may not be equal depending on the weight distribution of the machine 10 as determined by the ECU 44. The torque to the rear wheels 20L, 20R may be transmitted by a rear torque transfer shaft 58 extending from the torque transfer unit 56 to a rear differential 60. The rear differential 60 may then distribute a desired left torque to the left rear wheel 20L via a left rear axle 62L and a desired right torque to the right rear wheel 20R via a right rear axle 62R. Similarly, the torque to the front wheels 22L, 22R may be transmitted by a front torque transfer shaft 64 from the torque transfer unit 56 to a front differential 66, and then the desired left and right torques are distributed to the left and right front wheels 22L, 22R via left and right front axles 68L, 68R, respectively.

The torque transfer unit 56 and the rear and front differentials 60, 66 may be torque vectoring differentials that may distribute torque among the wheels 20L, 20R, 22L, 22R in order to optimize the traction and enhance the loading performance of the wheel loader 10 for the operations being performed by the machine 10. The torque transfer unit 56 and differentials 60, 66 may be any appropriate torque vectoring mechanism with the ability to vary the amount of power sent to each wheel in response to receiving a control signal from a control unit. Applicable torque vectoring mechanisms, such as those in taught U.S. Pat. No. 7,334,670 issued to Namuduri et al. on Feb. 26, 2008 and entitled "Torque Vectoring Differential for Controlling Vehicle Stability" and U.S. Pat. No. 7,294,083 issued Bowen on Nov. 13, 2007 and entitled "Torque Vectoring Axle Assembly," which are expressly incorporated by reference herein, will be apparent to those skilled in the art and are contemplated by the inventor as having use in machines in accordance with the present disclosure. The transmission 52, the torque transfer unit 56 and the differentials 60, 66 may be operably connected to and controlled by the ECU 44. The ECU 44 may receive signals from the transmission 52 and the sensors 48 to determine work cycle steps or other operations being performed by the machine 10 and the conditions for performing the operations, to determine a corresponding torque distribution for the wheels 20L, 20R, 22L, 22R, and to transmit control signals to the torque transfer unit 56 and the differentials 60, 66 to execute the calculated torque distribution.

Various operation conditions may be relevant to determining the torque distribution to be applied to the wheels 20L, 20R, 22L, 22R of the wheel loader 10 or any other machine that may haul material and be subject to varying weight distributions among its wheels. In a static state, weight distribution of a work machine such as the wheel loader 10 is affected by components geometries including wheel radius and pressure, mass and position of a load of work material, weights and centers of gravity of the body portion 12, non-engine end frame 14, axles 62, 68, linkage components 28-38 and the implement 26, as well as optional attachment masses and centers of gravity. Weight distribution is also affected by surface grade and slope. The fundamental design and operation of these machines is an exercise in weight balancing, with the weight of a load of material borne by the implement 26 being balanced by the counterweight of the components of the machine 10 pivoted about the axles 62, 68.

Figure 3:
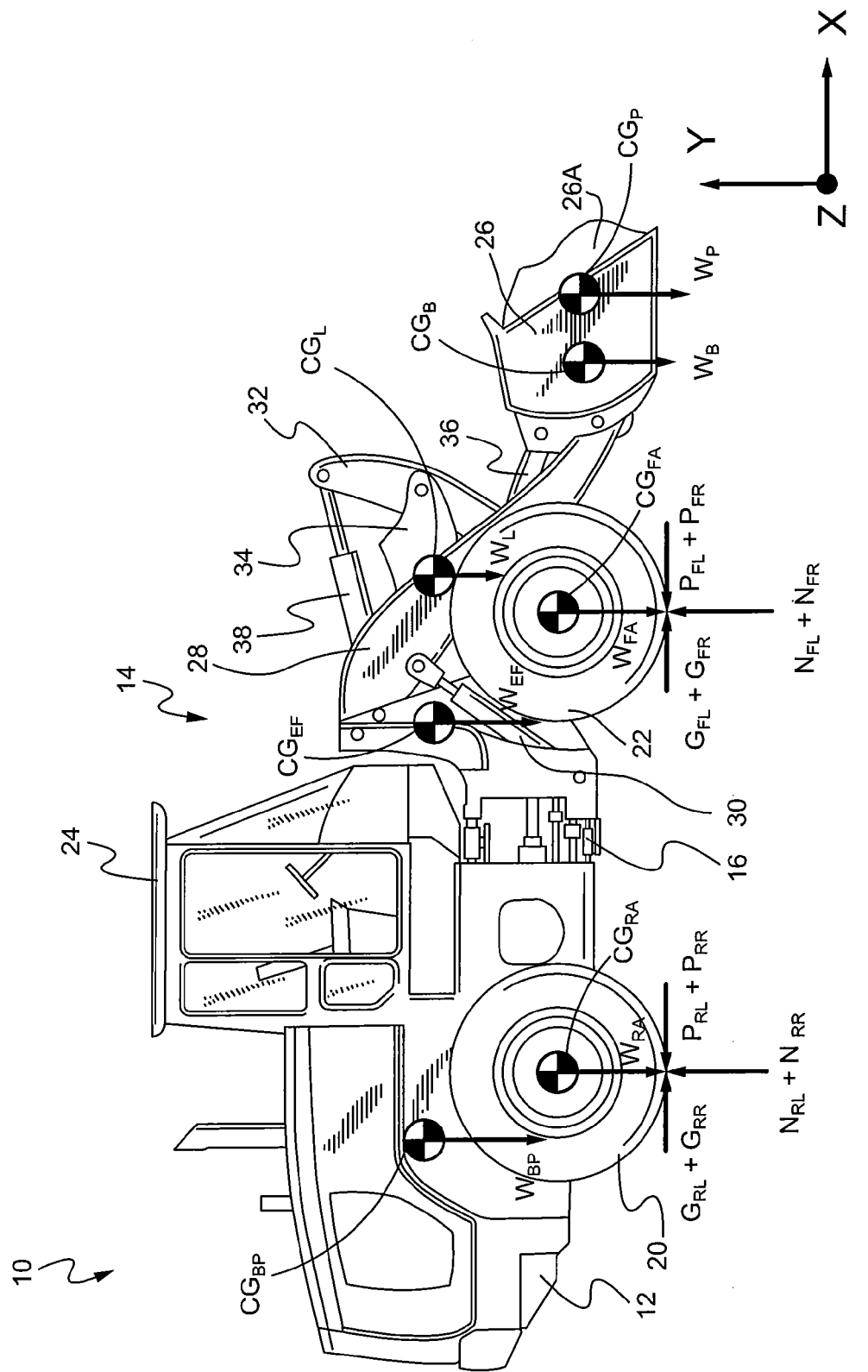
FIG. 3 is an exemplary free body diagram of component weights, powertrain forces and reactant ground forces acting on the wheel loader machine of FIG. 1.

The static condition of the wheel loader 10 is illustrated in FIG. 3. Exemplary locations of the centers of gravity $CG_i$ of the weights $W_i$ of the body portion 12 (BP), the end frame 14 (EF), the rear axle 62 and rear wheels 20 (collectively RA), the front axle 68 and front wheels 22 (collectively FA), the linkage components 28-38 (L), the bucket 26 (B) and a payload 26A (P) of work material in the bucket 26. The locations of the centers of gravity $CG_{BP}$, $CG_{EF}$, $CG_{RA}$ and $CG_{FA}$ remain relatively stationary with respect to each other, while the locations of the centers of gravity $CG_L$, $CG_B$ and $CG_P$ will change depending on the positions of the linkage components 28-38. The magnitudes of the weights $W_{BP}$, $W_{EF}$, $W_{RA}$, $W_{FA}$, $W_L$ and $W_B$ are approximately constant during use, and the weight $W_P$ is zero when the bucket 26 is empty and increases when the wheel loader 10 is operated to pick up a load of material. The weights $W_{BP}$, $W_{EF}$, $W_{RA}$, $W_{FA}$, $W_L$, $W_B$ and $W_P$ are supported by the surface on which the wheel loader 10 is located by reactive normal forces $N_{RL}$, $N_{RR}$, $N_{FL}$, $N_{FR}$ acting on the wheels 20L, 20R, 22L, 22R, respectively.

When the operator drives the wheel loader 10 forward and in reverse, the powertrain 18 creates torque on the axles 62L, 62R, 68L, 68R that results is powertrain forces $P_{RL}$, $P_{RR}$, $P_{FL}$, $P_{FR}$ on the wheels 20L, 20R, 22L, 22R, respectively, to rotate the wheels 20L, 20R, 22L, 22R and move the wheel loader 10. The movement is possible because the surface applies ground reactant forces $G_{RL}$, $G_{RR}$, $G_{FL}$, $G_{FR}$ to the wheels 20L, 20R, 22L, 22R, respectively, parallel to the surface and in the opposite direction as the powertrain forces $P_{RL}$, $P_{RR}$, $P_{FL}$, $P_{FR}$. The maximum ground reactant forces $G_{RL}$, $G_{RR}$, $G_{FL}$, $G_{FR}$ that may be produced is determined by the coefficient of friction between the ground and the wheels 20L, 20R, 22L, 22R and the magnitude of the normal forces $N_{RL}$, $N_{RR}$, $N_{FL}$, $N_{FR}$. Consequently, depending on the amount of torque applied to the axles 62L, 62R, 68L, 68R, the surface over which the wheel loader 10 travels, and the amount of weight supported by each of the wheels 20L, 20R, 22L, 22R, one or more of the powertrain forces $P_i$ may exceed the corresponding ground reactant force $G_i$ and the wheel(s) 20L, 20R, 22L, 22R may lose traction and skid and cause instability in the operation of the wheel loader. Drive train torque vectoring as disclosed herein will operate to improve the torque distribution efficiency by reducing or eliminating such traction loss and attendant instability.

The drive train torque vectoring method may implement an analysis of the forces in a free body diagram such as that shown in FIG. 3. The analysis may be based in part on ensuring that the following equations of equilibrium are maintained during operation of a machine such as the wheel loader 10 to maintain stability:

$$\Sigma F_X = 0 \quad (1)$$

$$\Sigma F_Y = 0 \quad (2)$$

$$\Sigma M_O = 0 \quad (3)$$

Using the coordinate axes of FIG. 3, equilibrium equation (1) indicates that the sum of the horizontal forces $F_X$ is equal to zero. The weights of the various components of the wheel loader 10 act downwardly on relatively flat surfaces, leaving the powertrain forces and the ground reactant forces as the only horizontal forces so that equilibrium equation (1) is expressed as follows:

$$G_{RL} + G_{RR} + G_{FL} + G_{FR} + P_{RL} - P_{RR} - P_{FL} - P_{RR} = 0 \quad (4)$$

Equation (4) is true where the powertrain force $F_i$ at each wheel 20, 22 does not exceed the maximum ground reactant force $G_i$ at the wheel 20, 22 as determined by multiplying the normal force $F_i$ at the wheel 20, 22 by the coefficient of friction between the wheel 20, 22 and the ground and, consequently, no wheel slippage is occurring.

Equilibrium equation (2) requires that the sum of the vertical forces $F_Y$ is also equal to zero. This is generally accurate where the surface fully supports the weight of the machine 10 and the payload 26A as expressed by the following:

$$N_{RL} + N_{RR} + N_{FL} + N_{FR} + W_{BP} - W_{EF} - W_L - W_B - W_{RA} - W_{FA} - W_P = 0 \quad (5)$$

The final equilibrium equation (3) indicates that sum of the moments about the Z-axis at a point on the machine 10 is equal to zero. Though any point may be used, an origin O may be selected at the point at which the front wheels 22 touch the ground to simplify the equation by eliminating the forces $W_{FA}$, $G_{RL}$, $G_{RR}$, $G_{FL}$, $G_{FR}$, $P_{RL}$, $P_{RR}$, $P_{FL}$ and $P_{RR}$ having lines of action through the origin O and consequently causing no moments about the origin O. Equilibrium equation (3) becomes:

$$(W_{BP} \times X_{BP}) + (W_{RA} \times X_{WB}) - (N_{RL} \times X_{WB}) - (N_{RR} \times X_{WB}) + (W_{EF} \times X_{EF}) - (W_L \times X_L) - (W_B \times X_B) - (W_P \times X_P) = 0 \quad (6)$$

Which simplifies to:

$$(W_{BP} \times X_{BP}) + ((W_{RA} - N_{RL} - N_{RR}) \times X_{WB}) + (W_{EF} \times X_{EF}) - (W_L \times X_L) - (W_B \times X_B) - (W_P \times X_P) = 0 \quad (7)$$

Where $X_i$ is the horizontal distance from the origin O to the corresponding center of gravity or line of action of the normal force. $X_{WB}$ in the example is equal to the wheel base and horizontal distance of each of the rear axle weight $W_{RA}$ and the rear left and right normal forces $N_{RL}$, $N_{RR}$. As with equation (4), equations (6) and (7) are true where the wheels 20, 22 do not slip due to the powertrain forces F exceeding the ground reactant forces G.

Where the machine 10 is balanced from side-to-side by design and only evenly distributed payloads 26A are expected, it may be assumed that the weight of the machine 10 and payload 26A will be divided equally between the left wheels 20L, 22L and the right wheels 20R, 22R so that $N_{RL} = N_{RR}$ and $N_{FL} = N_{FR}$ and two variables are eliminated from equations (4)-(7). Where imbalance is expected due to uneven weight distribution or operation of the machine 10 on side slopes where one side of the machine 10 is lower than the other, the normal forces Ni on the wheels 20, 22 on each side of the machine 10 may not be equal. However, applying the moment equilibrium equation (3) to the moments about the X-axis with the origin O located, for example, at approximately the center of the front right wheel 22R yields a fourth equilibrium equation:

$$(W_{BP} \times Z_{BP}) + (W_{RA} \times Z_{RA}) + (W_{EF} \times Z_{EF}) + (W_{FA} \times Z_{FA}) + (W_L \times Z_L) + (W_B \times Z_B) + (W_P \times Z_P) - ((N_{RL} - N_{FL}) \times Z_{WW}) = 0 \quad (8)$$

where $Z_i$ is the horizontal distance from the origin O in the Z direction to the corresponding center of gravity $CG_i$ or line of action of the normal force $N_i$. $Z_{WW}$ in the equation is equal to the wheel width between the wheel tread centers and is the horizontal distance of left front and rear normal forces $N_{FL}$, $N_{RL}$.

In the present example, masses of the machine 10 were grouped together for simplicity in visualization, explanation and management of the mathematical equations. However, in practice, greater precision may be attained with less grouping of elements and more precisely locating each mass affecting the determination of the distribution of torque to be applied to the wheels 20, 22. For example, each of the components contributing to the body portion weight $W_{BP}$, such as the rear frame rails, engine, transmission, operator module, cooling system and other components, could be treated as an individual mass having a center of gravity located in three dimensions within the machine 10 and included in equations (4)-(8). Those skilled in the art will understand that a trade off will exist between increasing the precision of the modeling of the components of the machine 10 and the processing and data storage requirements necessary to perform calculations using the additional data. The use of various combinations of precision and processing requirements in drive train torque vectoring is contemplated by the inventor as having use in work machines in accordance with the present disclosure.

Knowing the distribution of weight at the four wheels 20, 22 of the work machine 10 during operation as calculated using equations (4)-(8) makes it possible to modulate powertrain torque to the wheels 20, 22 in proportion to the ground reactant forces G and available traction. However, additional factors beyond the locations of the centers of gravity CG will affect the weight distribution and, correspondingly the torque distribution, as the machine 10 operates during a work cycle. For example, acceleration and deceleration in forward and reverse, and turning of the machine, may create dynamic forces and moments according to Newton's Second Law of Motion that have effects on the equilibrium equations (1)-(3) and, correspondingly, the weight distribution of the machine. Such factors are discussed further below and may be quantified and utilized in calculating the torque distribution in accordance with the present disclosure.

The direction and speed of the machine 10 may dictate variations in the torque distribution between the rear differential 60 and the front differential 66 as transmitted by the torque transfer unit 56. In general, and in particular when the wheel loader 10 has a full payload 26A of material in the bucket 26, the inertia of the various masses causes moments about the origin O as the wheel loader 10 accelerates and decelerates in each direction, thereby causing fluctuations in the distribution of the normal forces N. For example, the rear wheels 20 may support a lesser portion of the combined weight of the wheel loader 10 and the payload 26A when the wheel loader 10 moves in reverse than when moving forward, making it desirable to reduce the torque to the rear differential 60 to prevent the rear wheels 20 from slipping. Consequently, the ECU 44 may store an indication of the engaged gear of the transmission 52, which may be known to the ECU 44 if it is controlling the transmission 52, or may be provide to the ECU 44 by the transmission 52 via a feedback signal indicating the engaged gear. Alternatively, a rotary speed sensor operatively connected to one of the wheels 20L, 20R, 22L, 22R or one of the axles 62L, 62R, 68L, 68R may provide a signal indicating a magnitude, direction and rate of change of the rotation of the corresponding component of the machine 10 to the ECU 44.

The steering direction and steering rate of the machine 10 also affects the normal force N distribution over the wheels 20L, 20R, 22L, 22R. The centrifugal forces exerted by the masses of the wheel loader 10 and the payload 26A when the wheel loader 10 turns tend to shift the weight distribution to the outside wheels 20, 22 as the machine 10 turns. The centrifugal forces may cause moments about the X-axis in equation (8) tending to lift the inside wheels 20, 22 off the ground, reducing the normal forces N supporting the inside wheels 20, 22 and correspondingly increasing the normal forces N supporting the outside wheels 20, 22. Consequently, the machine 10 may include an appropriate steering direction sensor. Where the machine 10 includes a steering wheel in the cab 24, a rotary position sensor may transmit the angular position of the steering wheel or steering column to the ECU 44. Other machines 10 may be steered by joystick controls that do not merely rotate to cause the machine 10 to turn. Where the machine 10, such as that shown in FIG. 1, articulates the non-engine end frame 14 about the articulating joint 16 to turn, a rotary position sensor may be operatively connected to the articulating joint 16 to provide the angular position of the joint 16 to the ECU 44 as an indication of the turning radius of the machine 10. In other implementations, a yaw-rate sensor may be provided to measure the angular velocity of the machine 10 around its vertical axis and transmit the value to the ECU 44.

As mentioned previously, the positions of the centers of gravity $CG_L$, $CG_B$, $CG_P$ may change the weight distribution between the rear wheels 20 and the front wheels 22 of the machine 10. As the bucket 26 is lifted by the lift arms 28 and reoriented by the tilt lever 32 and tilt link 36, the horizontal and vertical positions of the linkage components 28-38, the bucket 26 and the payload 26A vary relative to the origin O. Correspondingly, the moment arms and moments caused by the weights and inertias of the linkage components 28-38, the bucket 26 and the payload 26A change, and change the distribution of the normal forces N between the rear wheels 20 and the front wheels 22. For example, as the bucket 26 is raised, the moment arms in the Y direction increase, and the moments created by the centers of gravity $CG_L$, $CG_B$, $CG_P$ when the wheel loader 10 accelerates and decelerates increase. Where linkages and hydraulic cylinders are used to manipulate an implement such as the bucket 26, forks or the like, the weight of the load carried by the implement may be determined by pressure sensors operatively connected to the lift cylinder(s) 30 and/or the tilt cylinder(s) 38 and transmitting pressure amounts in the cylinders 30, 38 to the ECU 44. Rotary position sensors on the links 28, 32, 36 and/or the cylinders 30, 38, which are already present in many machines, may transmit signals to the ECU 44 for calculating the link positions and, correspondingly, the position of the bucket 26 and payload 26A. Other types of sensors for determining the weight of the load and the position of the implement may also be implemented.

Depending on the work material and the manner in which the material is loaded onto the wheel loader 10, the weight may not be distributed evenly across the axles 62, 68. In such cases, the left wheels 20L, 22L or right wheels 20R, 22R may bear more of the load, and it may be desirable for stability to provide more torque to the higher loaded wheels 20, 22. The unbalanced load may be detected by pressure sensors on the lift cylinder(s) 30 and/or the tilt cylinder(s) 38, or on the wheels themselves to signal an abnormal wheel pressure shift to the left side or the right side. In machines such as articulated dump trucks as discussed further below, a system may be implemented wherein a camera takes a photograph of the load and the ECU 44 may analyze the image to determine whether the load is unbalanced. Other mechanisms for detecting unbalanced loads will be apparent to those skilled in the art.

It is common at work sites to have uneven surfaces having varying grades of slopes over which the wheel loader 10 may drive to get to and transport a load of work material. The wheel loader 10 may have to drive uphill or downhill, or along the side of a hill. In many instances, driving on a graded or sloped surface can affect the tendency of the wheels 20, 22 to slip and affect the weight distribution across the wheels 20, 22. The grade or slope of the hill creates weight components acting on the wheels parallel to the ground that must be balanced by the ground reactant forces G in equilibrium equation (1) to maintain equilibrium. Also, changes in the moments created about the origin O cause the lower or downhill wheels 20, 22 to bear more of the weight of the wheel loader 10 and the payload 26A than the upper or uphill wheels 20, 22. In such situations, it may be desirable to change the torque distribution to provide more torque to the downhill wheels 20, 22 to move the machine 10 and less torque to the uphill wheels 20, 22 to prevent slippage. Uphill or downhill grades, and left or right slopes may be detected in the machine by providing grade sensors or inclinometers capable of determining the pitch (rotation up or down about an axis parallel to the axles 62, 68) and/or the roll (rotation about an axis running from front to rear) of the machine 10. The inclinometer(s) would provide signals to the ECU 44 having values representing the pitch and roll of the machine for use in determining the weight distribution across the wheels 20L, 20R, 22L, 22R and a corresponding torque distribution to be implemented by the torque transfer unit 56 and differentials 60, 66.

Those skilled in the art will understand that the various sensors discussed herein are exemplary of the types of sensors or other mechanisms that may be implemented in machines 10 in accordance with the present disclosure. Other sensors and mechanisms for determining the direction, speed and steering or turning radius of the machine 10, the magnitude and location of a load of material, and the orientation of the surface over which the machine 10 travels and/or the machine 10 itself will be apparent to those skilled in the art, and are contemplated by the inventor as having use in machines in accordance with the present disclosure. In the succeeding discussion, such mechanisms referred to generically as a sensor of a particular operating condition for the machine 10 should be considered to include any appropriate sensor or mechanism for detecting the operating condition and providing information regarding the operating condition to the ECU 44.

Figure 4:
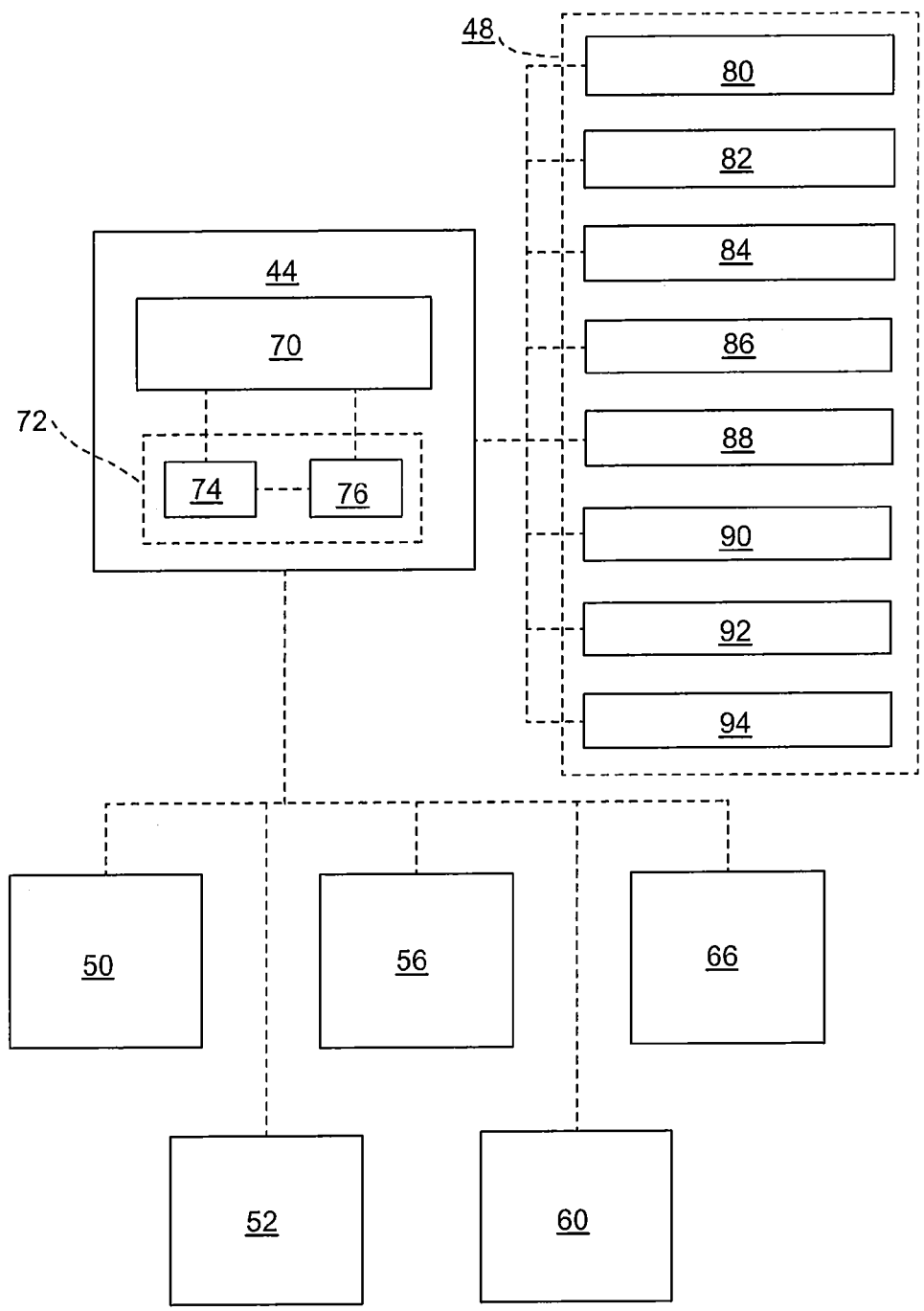
FIG. 4 is a schematic view of control system components of the wheel loader machine of FIG. 1.

Referring now to FIG. 4, the ECU 44 may include a microprocessor 70 for executing a specified program, which controls and monitors various functions associated with the machine 10. The microprocessor 70 includes a memory 72, such as ROM (read only memory) 74, for storing a program, and a RAM (random access memory) 76 which serves as a working memory area for use in executing the program stored in the memory 72. Although the microprocessor 70 is shown, it is also possible and contemplated to use other electronic components such as a microcontroller, an ASIC (application specific integrated circuit) chip, or any other integrated circuit device. The ECU 44 electrically connects to the engine 50, the transmission 52, the torque transfer unit 56 and the differentials 60, 66. The ECU 44 may also electrically connect to one or more sensors 48 in the form of a machine direction sensor 80, a machine speed sensor 82, a machine turn direction sensor 84, a load weight sensor 86, a load position sensor 88, a load offset sensor 90, and machine orientation sensors in the form of a machine grade sensor 92 and a machine slope sensor 94.

The sensors 80-94 may be of the types mechanisms described above or any other appropriate mechanisms for monitoring the corresponding operating conditions. Moreover, one or more of the sensors 80-94 may be omitted where the information is available from other sources, such as the vehicle direction being obtained from the transmission 52 or the ECU 44. Additionally, two or more of the sensors 80-94 may be combined or the information provided by a single mechanism, such as pressure sensors on or in the wheels 20, 22, on the axles 62, 68, and the like, providing information indicative of load weight amount and position, or a two or three axis inclinometer performing the functions of the machine grade sensor 92 and machine slope sensor 94 by providing indications of the pitch, roll and/or yaw of the machine 10.

Figure 5:
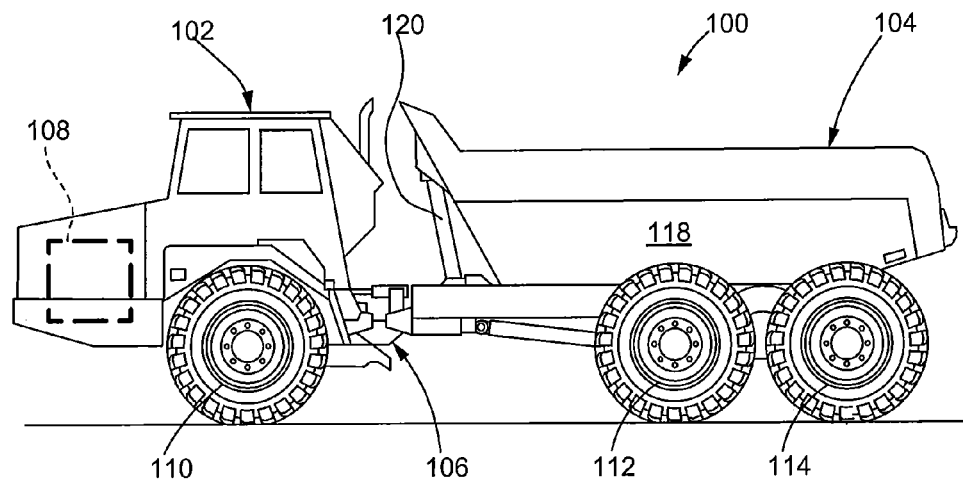
FIG. 5 is a side elevation view of an articulated dump truck in accordance with the present disclosure.

Another type of material hauling machine is illustrated in FIG. 5 in the form of an articulated dump truck 100. The articulated dump truck 100 may include a tractor portion 102 and a trailer portion 104 connected by an articulating joint 106. The tractor portion 102 may house a powertrain 108 including an engine and transmission that drive front wheels 110 and two sets of rear wheels 112, 114, and includes an elevated cab 116 for the operator. The tractor portion 102 includes the front wheels 110 that are turned by the steering mechanism, with the articulating joint 106 allowing the tractor portion 102 and the trailer portion 104 to move from side-to-side to turn the articulated dump truck 100. The trailer portion 104 includes a bed 118 that receives loads of work material to haul to other locations on the work site or offsite. The trailer portion 104 may be pivotally connected proximate the rear of the trailer portion 104. The bed 118 rotates about the point of connection to the trailer portion 104 to dump work material from the rear of the bed 118, with the rotation of the bed 118 being controlled by a lift cylinder 120 pivotally coupled to the trailer portion 104 and the bed 118 proximate the tractor portion 102. The lift cylinder 120 may be extended to raise the bed 118 and retracted to lower the bed 118. In alternative implementations, the bed 118 may be pivotally connected along the left or right side of the trailer portion 104, with the lift cylinder 120 extending to raise the bed 118 and dump the work material to the side of the articulated dump truck 100.

Figure 6:
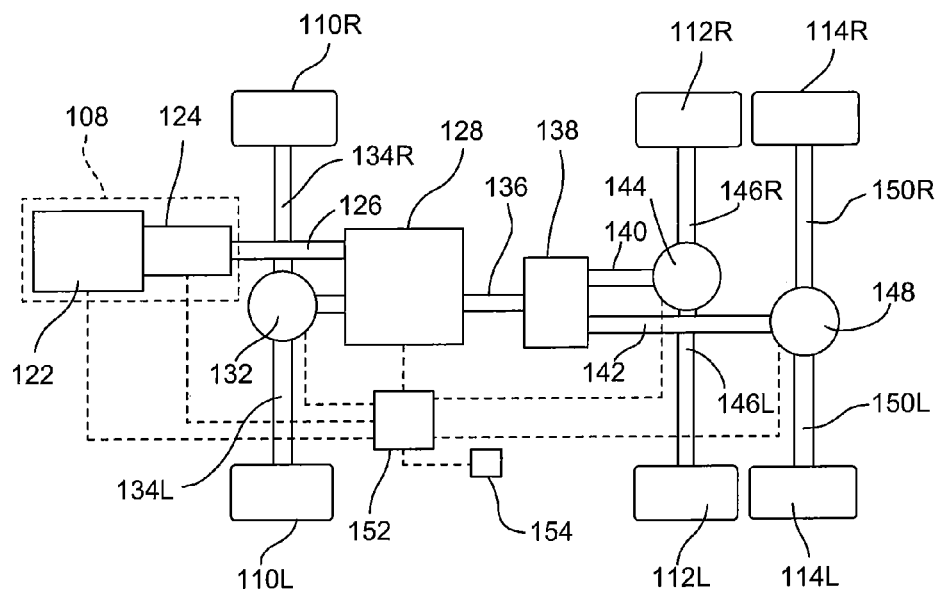
FIG. 6 is a schematic view of the power transmission and drive elements of the articulated dump truck of FIG. 5.

As with the wheel loader 10, the articulated dump truck 100 may be all-wheel drive, with the powertrain 108 driving the front wheels 110 and the rear wheels 112, 114 to provide stability as the dump truck 100 is operated to move work material. FIG. 6 is a schematic illustration of an exemplary combination of the drive components of the articulated dump truck 100. The powertrain 108 includes an engine 122 and a transmission 124. A drive shaft 126 connects the transmission 124 to a torque transfer unit 128 that distributes torque from the powertrain 108 between the front wheels 110L, 110R and the two sets of rear front wheels 112L, 112R, 114L, 114R. The torque to the front wheels 110L, 110R may be transmitted by a front torque transfer shaft 130 extending from the torque transfer unit 128 to a front differential 132. The front differential 132 may then distribute torque to the left front wheel 110L via a left front axle 134L and to the right front wheel 110R via a right front axle 134R.

The torque to the rear wheels 112, 114 may be transmitted by a main rear torque transfer shaft 136 to an intermediate gear box 138 that may divide the torque between a first rear torque transfer shaft 140 and a second rear torque transfer shaft 142. The first rear torque transfer shaft 140 connects to a first rear differential 144 that distributes torque to the left and right first rear wheels 112L, 112R via left and right first rear axles 146L, 146R, respectively. The second rear torque transfer shaft 142 connects to a second rear differential 148 that distributes torque to the left and right second rear wheels 114L, 114R via left and right second rear axles 150L, 150R, respectively.

The torque transfer unit 128, the front differential 132 and the rear differentials 144, 148 may be torque vectoring differentials as discussed above that may distribute torque among the wheels 110L, 110R, 112L, 112R, 114L, 114R in order to optimize the traction and enhance the loading performance of the articulated dump truck 100 for the operations being performed by the truck 100. The transmission 124, the torque transfer unit 128 and the differentials 132, 144, 148 may be operable connected to and controlled by an ECU 152. The ECU 152 may receive signals from the transmission 124 and sensors 154 to determine the path and speed of the dump truck 100, characteristics of a load of material being hauled by the dump truck 100, and the conditions for hauling the load over a surface, to determine a corresponding torque distribution for the wheels 110L, 110R, 112L, 112R, 114L, 114R, and to transmit control signals to the torque transfer unit 128 and the differentials 132, 144, 148 to execute the calculated torque distribution.

Figure 7:
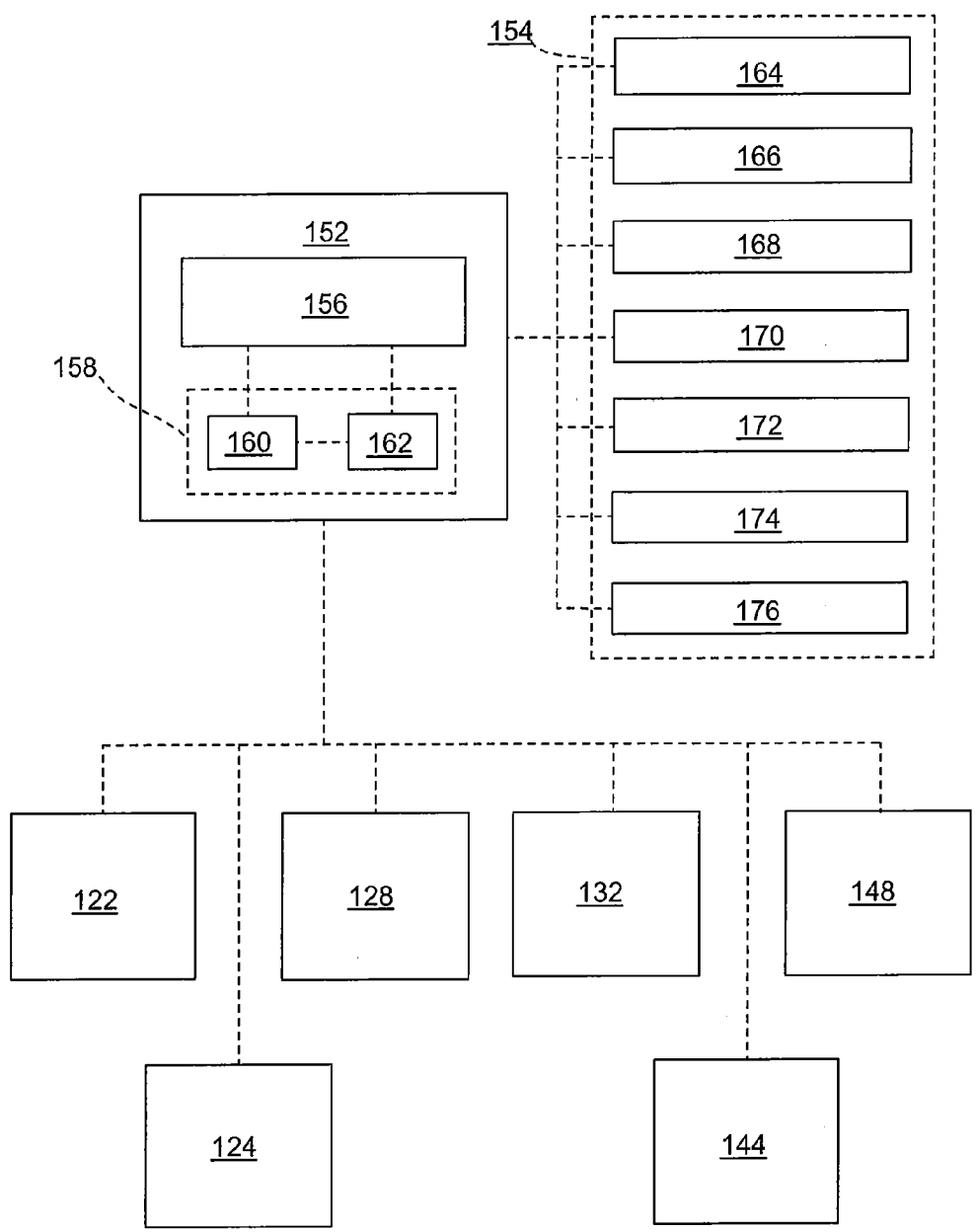
FIG. 7 is a schematic view of control system components of the articulated dump truck of FIG. 5.

FIG. 7 illustrates the ECU 152 and other electrical and electro-mechanical components of the dump truck 100 that function to determine and execute a torque distribution for the dump truck 100. The ECU 152 may include a microprocessor 156 for executing a specified program, which controls and monitors various functions associated with the dump truck 100. The microprocessor 156 includes a memory 158, such as ROM 160 for storing a program, and a RAM 162 which serves as a working memory area for use in executing the program stored in the memory 158. Although the microprocessor 156 is shown, it is also possible and contemplated to use other electronic components such as a microcontroller, an ASIC (application specific integrated circuit) chip, or any other integrated circuit device. The ECU 152 electrically connects to the engine 122, the transmission 124, the torque transfer unit 128 and the differentials 132, 144, 148. The ECU 152 may also electrically connect to one or more sensors 154 in the form of a truck direction sensor 164, a truck speed sensor 166, a truck turn direction sensor 168, a load weight sensor 170, a load offset sensor 172, a truck grade sensor 174 and a truck slope sensor 176. The sensors 164-176 may be similar to the corresponding sensors as discussed above.

The dump truck 100 and other material hauling machines having drive train torque vectoring in accordance with the present disclosure may be subjected a similar analysis of the forces in a free body diagram as discussed above in relation to FIG. 3 to determine appropriate distributions of torque to the wheels 110, 112, 114. The positions of centers of gravity CG and weights W of the components that are relatively static during operation of machine may be determined during development, while the positions and/or weights that vary during operation, such as the position of the bed 118 and the weight W and the position of material deposited in the bed 118, may be determine in real time by the electronic control unit 152 based on the signals from the various sensors 154. The information may be used in equilibrium equations similar to equations (4)-(8) to determine the weight distribution across the wheels 110, 112, 114 and corresponding torque distribution for stable operation of the machines during execution of their corresponding work cycles.

INDUSTRIAL APPLICABILITY

As discussed above, machines such as the wheel loader 10 and the articulated dump truck 100 in accordance with the present disclosure provide a distribution of the power provided by the powertrains 18, 108 to the wheels 20, 22, 110, 112, 114 based on the distribution of the weight of the machines 10, 100 and loads of material being hauled, and the conditions under which the material is being hauled. The ECUs 44, 152 receive signals from the sensors 80-94, 164-176 providing information regarding the load of material, the operations of the machines 10, 100 and the operating conditions at the worksite, use the information to determine, among other factors, the weight distribution of the machines 10, 100 and loads of material, calculate the power distribution to the wheels 20, 22, 110, 112, 114 for driving the machines 10, 100 to haul the material, and output control signals to the torque transfer units 56, 128 and differentials 60, 66, 132, 144, 148 to operate to distribute power to the wheels 20, 22, 110, 112, 114.

Figure 8:
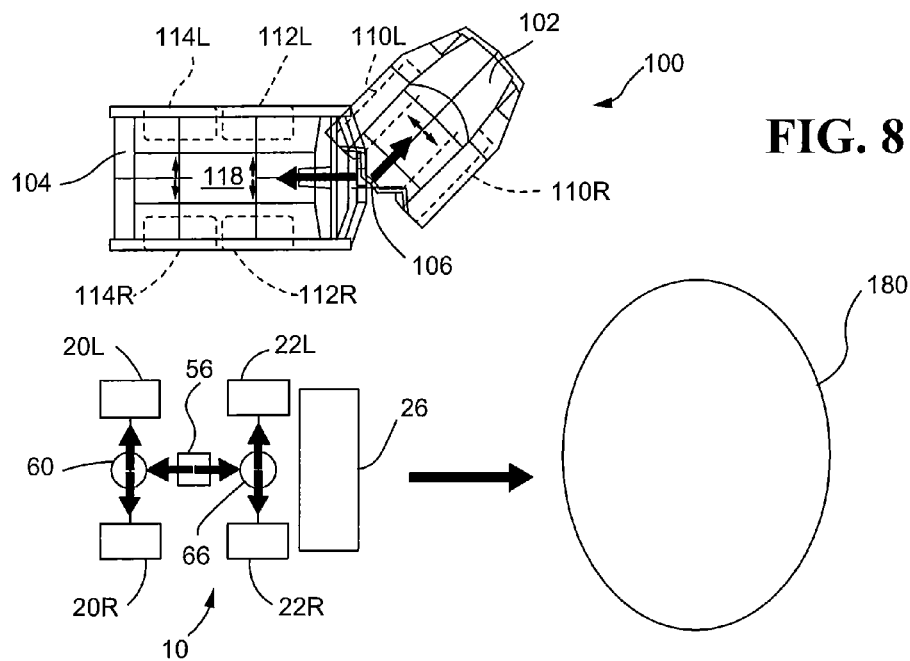
FIG. 8 is a schematic illustration of a truck loading work cycle for the wheel loader machine of FIG. 1 and the articulated dump truck of FIG. 5 with the wheel loader machine approaching a pile of work material.

FIGS. 8-14 schematically illustrate a typical work cycle in which the wheel loader 10 picks up a load of material and deposits the load in the bed 118 of the articulated dump truck 100. Turning to FIG. 8, the work cycle begins with the wheel loader 10 with the bucket 26 empty approaching a pile 180 of work material. The machine direction sensor 80 and machine speed sensor 82 may transmit signals to the ECU 44 indicating that the wheel loader 10 is moving forward at a certain speed. The machine turn direction sensor 84 may transmit a signal indicating that the wheel loader 10 is moving in a straight path. The weight of the unloaded wheel loader 10 may be approximately evenly distributed across the wheels 20L, 20R, 22L, 22R. In this condition, the load weight sensor 86 and the load offset sensor 90 may transmit signals to the ECU 44 indicating that, for example, the lift cylinders 30 are only supporting the empty weight of the bucket 26. In this example, the wheel loader 10 and articulated dump truck 100 may be operating on a relatively flat surface, and the machine grade sensor 92 and the machine slope sensor 94 may transmit signals to the ECU 44 indicating that the pitch and roll angles for the wheel loader 10 are essentially zero.

The ECU 44 may be programmed with a default or baseline torque distribution for operation of the wheel loader 10 under the conditions shown in FIG. 8 where the wheel loader 10 is unloaded and operating on even ground. In the present example, the default torque distribution may be an even distribution between the rear wheels 20 and the front wheels 22, and between the left wheels, 20L, 22L and the right wheels 20R, 22R. The arrows at the torque transfer unit 56 indicate that the ECU 44 determines an even weight distribution across the wheels 20, 22 and outputs control signals causing the torque transfer unit 56 to divide the torque from the engine 50 with an approximately 50/50 split between the torque transfer shafts 58, 64. At the same time, the ECU 44 may output control signals causing the differentials 60, 66 to divide the torque from the respective torque transfer shafts 58, 64 to the wheels 20L, 20R, 22L, 22R with an approximately 50/50 split. The default torque distribution is only exemplary, and the torque may be divided as necessary for stable operation of the wheel loader 10. Consequently, a greater portion of the torque may be transferred by the torque transfer unit 56 in the default condition to the rear differential 60 if the body portion 12 of the wheel loader 10 is weighted to counterbalance the loads of material in the bucket 26.

FIG. 8 further illustrates the articulated dump truck 100 as being stationary as the wheel loader 10 loads material into the bed 118. The truck direction sensor 164 and the truck speed sensor 166 may transmit signals to the ECU 152 indicating that the truck 100 is stationary. The truck turn direction sensor 168 may transmit a signal indicating that the articulating joint 106 is articulated to make a left hand turn if the truck 100 was moving. If moving, the ECU 152 may transmit control signals to the differentials 132, 144, 148 to direct more torque to the outer or right wheels 110R, 112R, 114R at a ratio of, for example, approximately 70/30 or 60/40 to execute the turn. With the truck 100 stationary as shown, the ECU 152 may not transmit control signals to the differentials 132, 144, 148 so that differentials 132, 144, 148 maintain a default torque distribution at an approximately 50/50 ratio. Those skilled in the art will understand that the ratios for distribution of the powertrain torque between the wheels 20L, 20R, 22L, 22R are exemplary only, and the actual ratios will be determined for each machine based on the particular kinematic characteristics of the components of the machines and of the loads hauled by the machines.

The load weight sensor 170 and the load offset sensor 172 may transmit signals to the ECU 152 indicating that the bed 118 of the truck 100 is empty, and the truck grade sensor 174 and the truck slope sensor 176 may transmit signals to the ECU 152 indicating that the pitch and roll angles for the truck 100 are essentially zero. Under these conditions, the ECU 152 may transmit control signals to the torque transfer unit 128 and differentials 132, 144, 148 when the dump truck 100 is moving to implement the default torque distribution for the truck 100. In this example, a greater amount of torque may be transferred by the torque transfer unit 128 to the rear differentials 144, 148 than to the front differential 132 at, for example, a 60/40 or 70/30 ratio as indicated by the arrows at the articulating joint 106.

Figure 9:
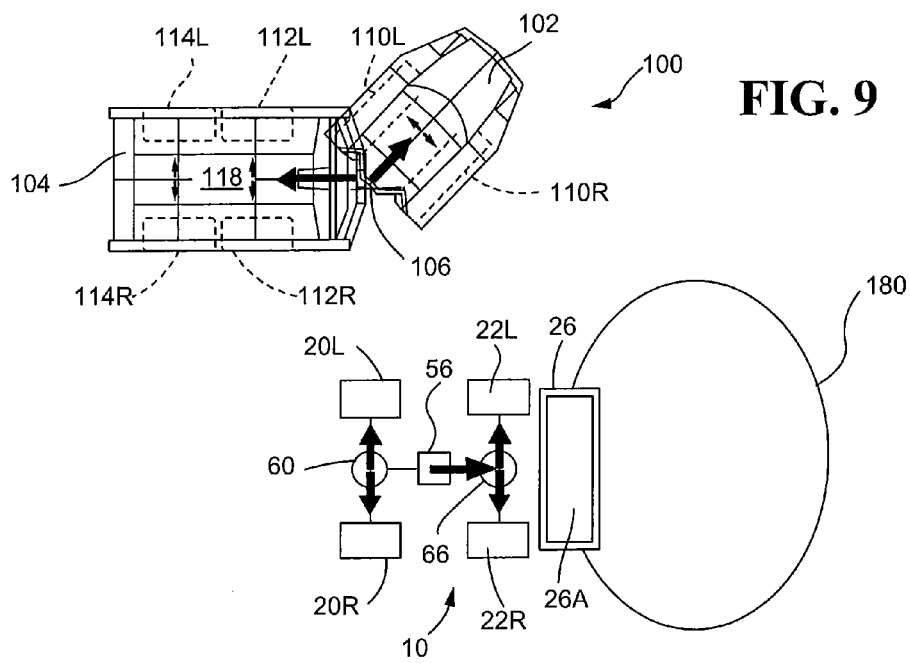
FIG. 9 is a schematic illustration of the truck loading work cycle of FIG. 8 with the wheel loader machine digging and lifting a load of work material.

FIG. 9 illustrates the next step in the work cycle wherein the wheel loader 10 digs into the pile 180 to accumulate a payload 26A of material in the bucket 26. As the wheel loader 10 digs in and raises the bucket 26 through the pile 180, large forces are applied at the front of the wheel loader 10 and the rear end of the body portion 12 tends to lift off the ground. The load weight sensor(s) 86 of the lift cylinder 30 and the tilt cylinder 38 and the load position sensor 88 transmit signals to the ECU 44 indicating the weight increase corresponding to the payload 26A and lifting of the bucket 26 through the pile 180. The ECU 44 determines that the weight distribution is substantially at the front of the wheel loader 10, and more torque to the front wheels 22 is needed to drive the wheel loader 10 into the pile and the torque to the rear wheels 20 may be reduced to preventing slippage. The ECU 44 transmits signals to the torque transfer unit 56 to increase the torque to the front differential 66 so that the front wheels 22 receive as much as 100% of the torque output from the powertrain 108.

Figure 10:
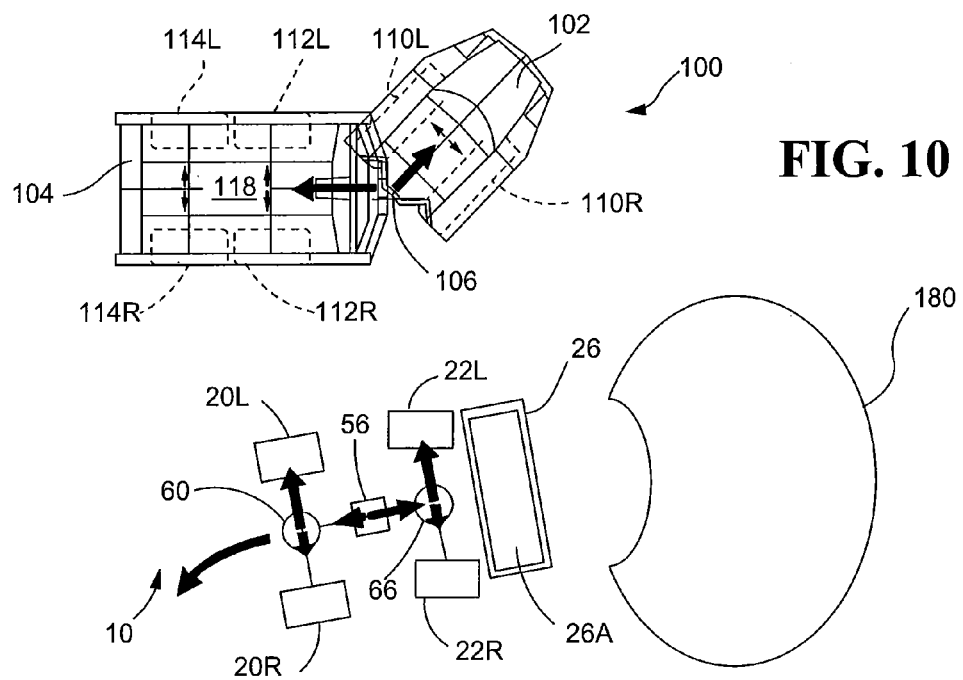
FIG. 10 is a schematic illustration of the truck loading work cycle of FIG. 8 with the wheel loader machine backing out of the pile of work material and turning toward the articulated dump truck.

After accumulating the payload 26A in the bucket 26, the operator backs the wheel loader 10 out of the pile 180 and begins to reposition the wheel loader 10 to dump the payload 26A in the bed 118 of the dump truck 100. As shown in FIG. 10, the wheel loader 10 may be driven in reverse and turned to the right to begin angling the wheel loader 10 toward the truck 100. The machine direction sensor 80 and machine speed sensor 82 transmit signals indicating that the wheel loader 10 is moving in reverse and accelerating at least initially. The load weight sensor 86 and load position sensor 88 transmit signals to the ECU 44 indicating the magnitude and position of the payload 26A. The ECU 44 determines that weight distribution places more weight on the front wheels 22L, 22R. Moreover, the moments created by the masses and the payload 26A about the origin O during rearward acceleration further reduces the weight on the rear wheels 20L, 20R. As a result, the ECU 44 may transmit control signals to the torque transfer unit 56 causing the torque transfer unit 56 to distribute a great portion of the torque from the powertrain 18 to the front differential 66, such as with an approximate 80/20 ratio.

The machine turn direction sensor 84 may transmit signals indicating that the wheels 22L, 22R are turned to the right. For simplicity in the schematic illustrations of the wheel loader 10, the front wheels 22L, 22R turn independently as with a rack-and-pinion mechanism, as opposed to the end frame 14 articulating as shown in FIG. 1, but the controls discussed herein are applicable to these and other steering mechanisms for the wheel loader 10, the dump truck 100 or other work machines such as for example, backhoe loaders, that are known to those skilled in the art. Based on the signals from the machine turn direction sensor 84, the ECU 44 may determine to transmit more torque to drive the outside wheels 20L, 22L and transmit control signals to the differentials 60, 66 to distribute torque to the wheels 20L, 22L at an approximate 70/30 ratio with the inside wheels 20R, 22R.

Figure 11:
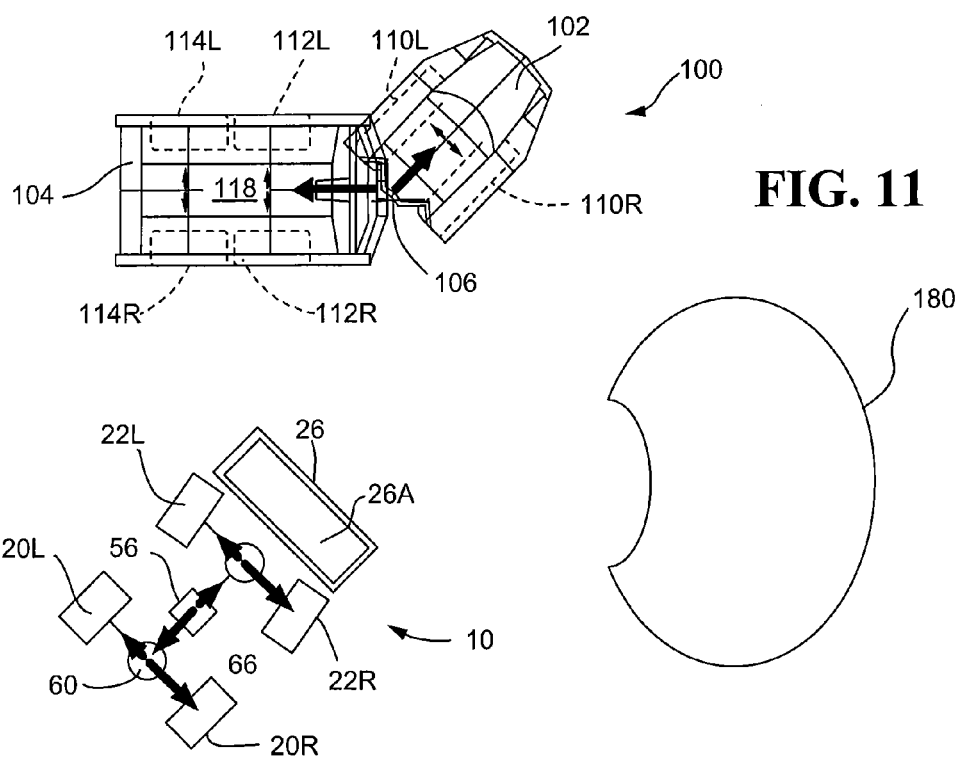
FIG. 11 is a schematic illustration of the truck loading work cycle of FIG. 8 with the wheel loader machine changing direction of motion from reverse to forward.

FIG. 11 illustrates the transition of the wheel loader 10 from reverse to forward so the wheel loader 10 can approach the dump truck 100. The machine direction sensor 80 may transmit signals to the ECU 44 signaling the transitions from reverse to forward, and the machine speed sensor 82 transmits signals indicating the deceleration of the wheel loader 10. As the wheel loader 10 slows, the effect of the moments created by the masses and the payload 26A may be reversed and shift the weight distribution back toward the rear axle 62. Correspondingly, the ECU 44 may redistribute the torque to the differentials 60, 66 so that the rear differential 60 receives more torque by approximately a 60/40 ratio. At the same time, the operator may turn the wheels 22L, 22R to the left toward the dump truck 100, and the machine turn direction sensor 84 may transmit a corresponding signal to the ECU 44. The ECU 44 in turn may transmit control signals to the differentials 60, 66 to transmit more torque to the right wheels 20R, 22R that will now be on the outside of the turn in approximately a 70/30 ratio with the left wheels 20L, 22L.

Figure 12:
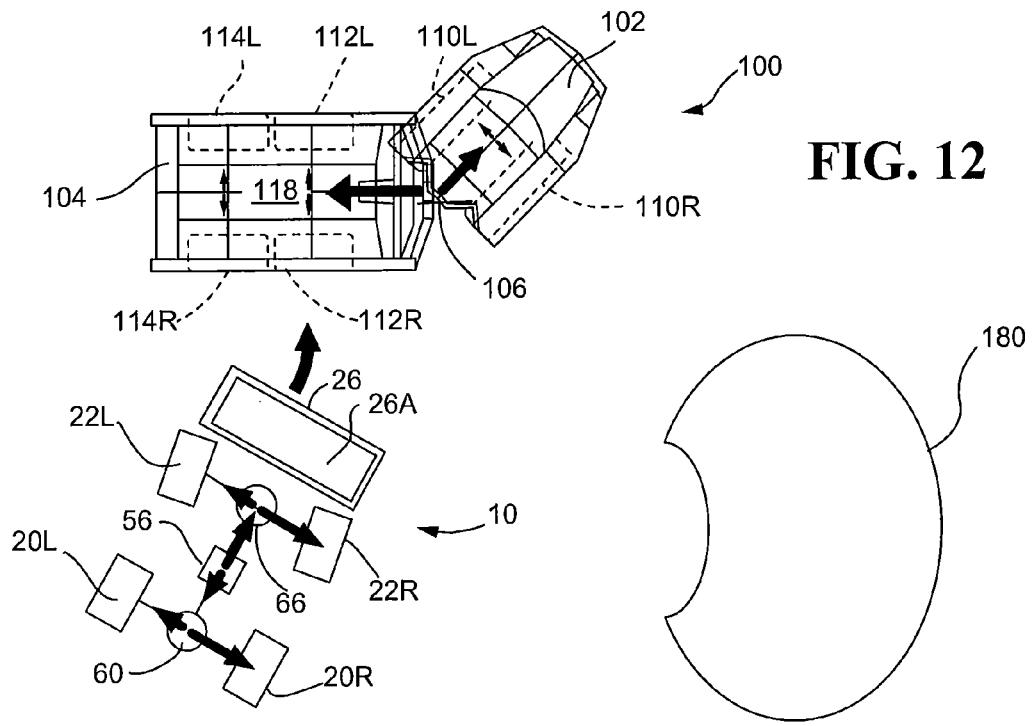
FIG. 12 is a schematic illustration of the truck loading work cycle of FIG. 8 with the wheel loader machine approaching the articulated dump truck.

As the wheel loader 10 accelerates toward the dump truck 100 in FIG. 12, the moments of inertia created by the masses and the payload 26A partially counter the dead weight of the payload 26A to shift the weight distribution partially toward the rear axle 62. This may require less torque transmission to the front differential 66 than when the wheel loader 10 is moving in reverse as shown in FIG. 10. The machine direction sensor 80 and machine speed sensor 82 may transmit signals to the ECU 44 indicating the forward movement of the wheel loader 10. The ECU 44 may use the signals from the sensors 80, 82 to determine that an appropriate torque distribution may be approximately 60% to the front differential and approximately 40% to the rear differential 60. The signals transmitted to the ECU 44 by the machine turn direction sensor 84 may still indicate that the wheels 22L, 22R are turned to the left, and the ECU 44 may continue to command the differentials 60, 66 to distribute approximately 70% of the torque to the outside wheels 20R, 22R.

Figure 13:
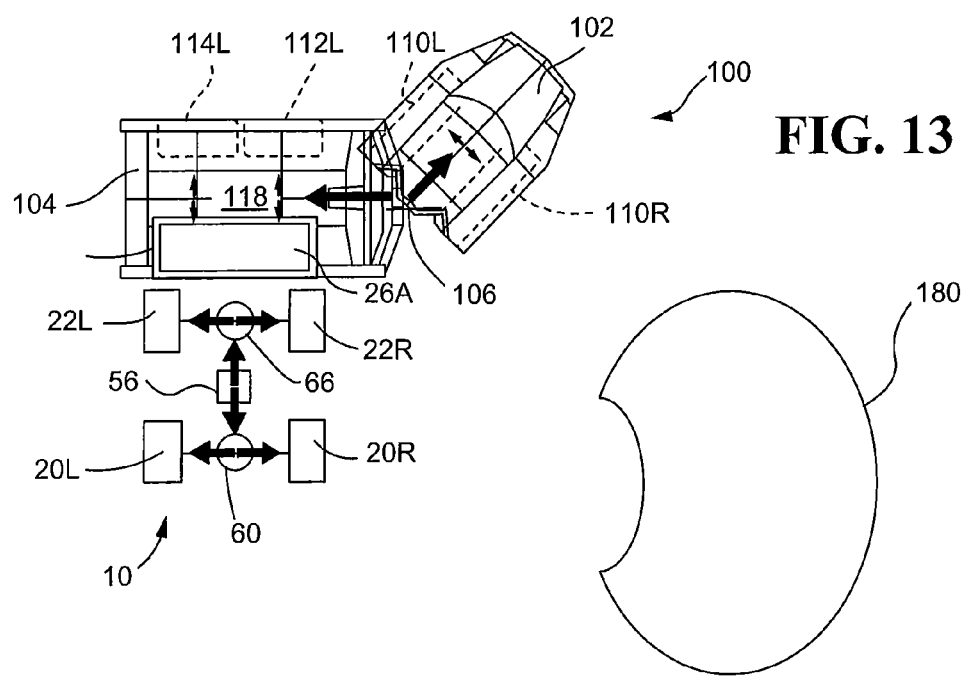
FIG. 13 is a schematic illustration of the truck loading work cycle of FIG. 8 with the wheel loader machine dumping the load of work material into the articulated dump truck.

In FIG. 13, the wheel loader 10 arrives at the dump truck 100 and dumps the payload 26A of work material into the bed 118 of the truck 100. The wheel loader 10 stops and, as the payload 26A is dumped, the weight distribution over the wheels 20, 22 returns to the normal unloaded distribution. The machine speed sensor 82 transmits signals to the ECU 44 indicating that the wheel loader 10 has stopped. The load weight sensor(s) 86 detect the decrease in hydraulic pressure in the lift cylinder 30 and tilt cylinder 38 as the material pours out of the bucket 26, and the values of the corresponding signals transmitted to the ECU 44 decrease until all material is emptied from the bucket 26 and into the bed 118 of the truck 100. With the wheel loader 10 stopped and the bucket 26 empty, the ECU 44 transmits control signals to the torque transfer unit 56 and the differentials 60, 66 to restore the initially even torque distributions from the torque transfer unit 56 to the differentials 60, 66, and from the differentials 60, 66 to the wheels 20, 22, respectively, as discussed previously in relation to FIG. 8.

Figure 14:
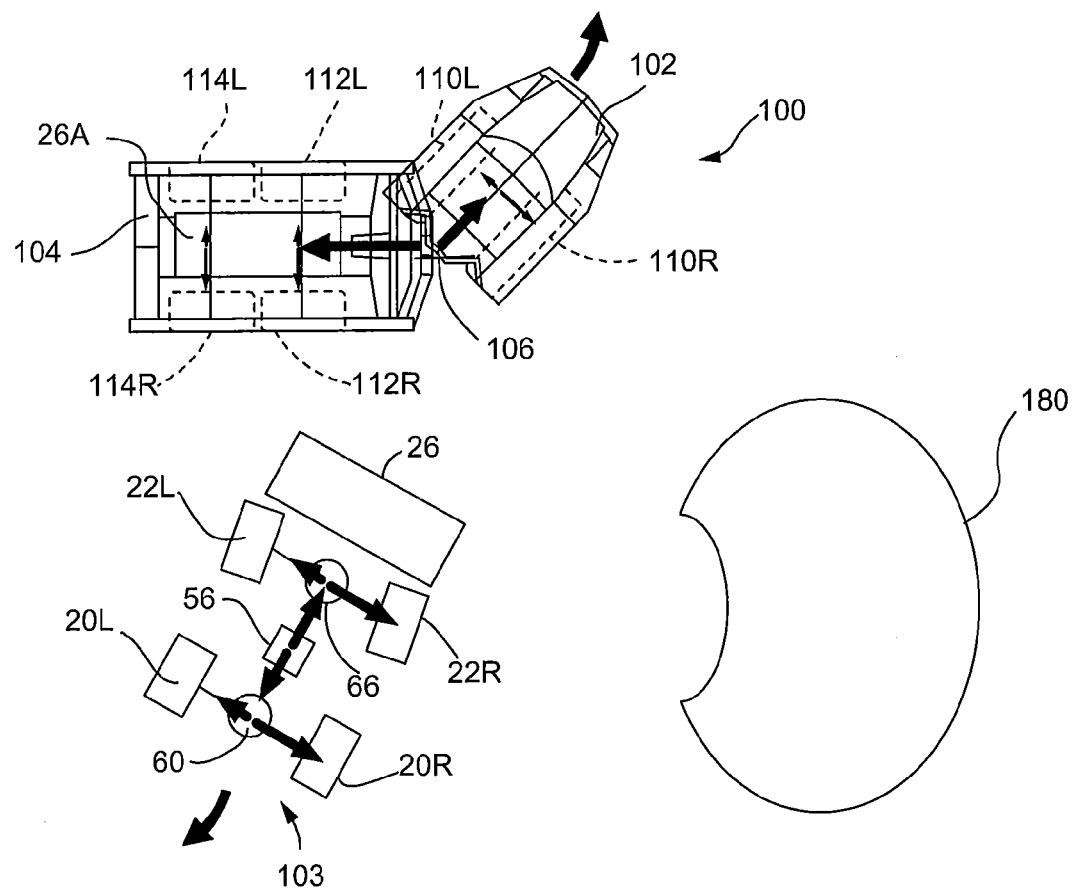
FIG. 14 is a schematic illustration of the truck loading work cycle of FIG. 8 with the unloaded wheel loader machine backing away from the articulated dump truck.

With the bucket 26 empty, the operator backs the wheel loader 10 away from the dump truck 100 and begins to reposition the wheel loader 10 to pick up another load of material from the pile 180. As shown in FIG. 14, the wheel loader 10 may be driven in reverse and turned to the left to begin angling the wheel loader 10 toward the pile 180. The machine direction sensor 80 and machine speed sensor 82 transmit signals indicating that the wheel loader 10 is moving in reverse and at a constant speed after the initial acceleration in the reverse direction. The load weight sensor 86 and load position sensor 88 transmit signals to the ECU 44 indicating that the bucket 26 is empty. The ECU 44 determines that weight distribution approximately balanced between the rear wheels 20L, 20R and the front wheels 22L, 22R. The machine turn direction sensor 84 may transmit signals indicating that the wheels 22L, 22R are turned to the left. Based on the signals from the machine turn direction sensor 84, the ECU 44 may determine to transmit more torque to drive the outside wheels 20R, 22R and transmit control signals to the differentials 60, 66 to distribute torque to the wheels 20R, 22R at an approximate 70/30 ratio with the inside wheels 20L, 22L.

Figure 15:
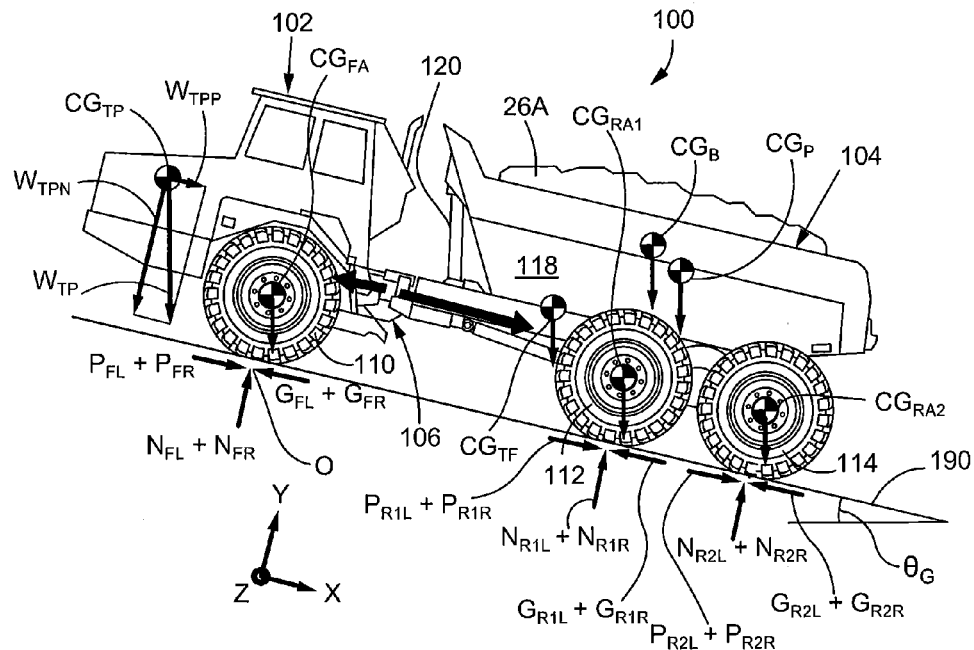
FIG. 15 is a schematic illustration of the articulated dump truck of FIG. 5 traveling on an uphill grade.
Figure 16:
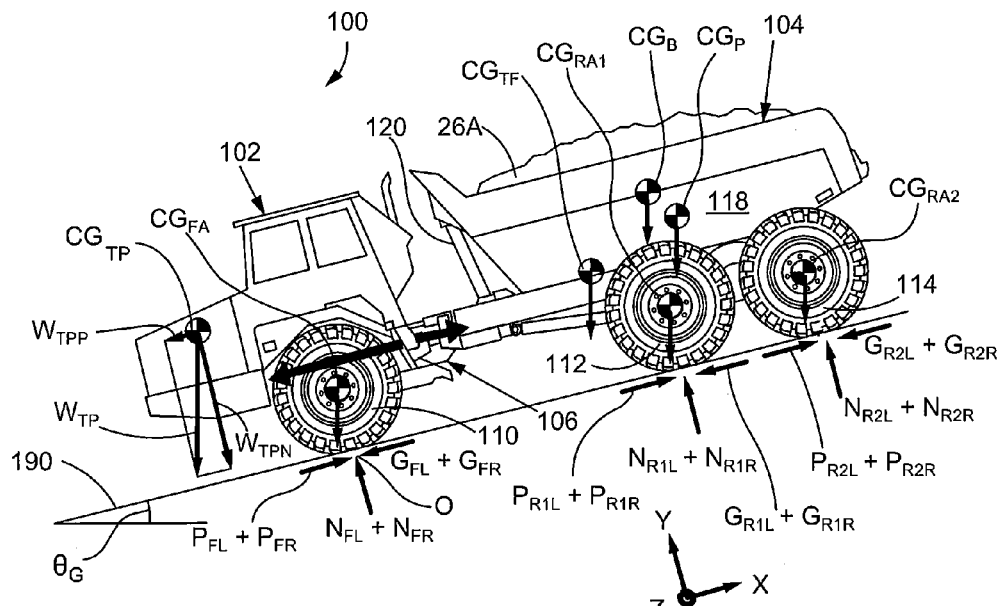
FIG. 16 is a schematic illustration of the articulated dump truck of FIG. 5 traveling on a downhill grade.

FIGS. 15 and 16 illustrate conditions where a machine such as the dump truck 100 drives over a graded surface having an incline or a decline. The equilibrium equations (1)-(3) may be applied in a similar manner as discussed above to determine the distribution of the normal forces $N_i$ acting on the wheels 110, 112, 114 by the graded surface 190 and the appropriate distribution of the powertrain torque to the wheels 110, 112, 114 for stable operation without slipping. Exemplary locations for the centers of gravity $CG_i$ of the weights of the tractor portion 102 (TP), the frame of the trailer portion 104 (TF), the front axle 134 and front wheels 110 (collectively FA), the first rear axle 146 and rear wheels 112 (collectively RA1), the second rear axle 150 and rear wheels 114 (collectively RA2), the bed 118 (B) and the payload 26A of work material (P). The weights at the centers of gravity $CG_i$ act downwardly and at an angle with respect to a line normal to the graded surface 190 equal to a grade angle $\theta_G$ of the hill.

To simplify the calculations of the normal forces N, the equilibrium equations (1)-(3) may be applied by rotating the XYZ coordinate system about the Z-axis by an Euler angle equal to the grade angle $\theta_G$ so the X-axis is aligned parallel to the graded surface 190 and the Y-axis is normal to the graded surface 190 as shown. Using this adjusted coordinate system, the weight W at each center of gravity $CG_i$ may be broken up into an X component that acts parallel to the graded surface 190 and a Y component that acts normal to the graded surface 190. For example, the weight $W_{TP}$ of the tractor portion 102 may have a weight component $W_{TPP}$ parallel to the graded surface 190 and a weight component $W_{TPN}$ normal to the graded surface 190. The parallel weight component $W_{TPP}$ would be used in equilibrium equation (1), the normal weight component $W_{TPN}$ would be used in equilibrium equation (2), and both weight components $W_{TPP}$, $W_{TPN}$ may be used in equilibrium equation (3) depending on the location chosen for the origin O. Similar components would be determined for each of the other weights and act at the corresponding centers of gravity $CG_i$.

As the dump truck 100 drives up the graded surface 190, the various sensors 154 of the dump truck 100 provide signals to the ECU 152 for determining the operating conditions of the dump truck 100. The truck direction sensor 164 and truck speed sensor 166 may transmit signals to the ECU 152 indicating that the truck 100 is moving forward at a certain speed and may be accelerating or decelerating. The truck turn direction sensor 168 may transmit a signal indicating that the dump truck 100 is moving in a straight path. The load weight sensor 170 and load offset sensor 172 may transmit signals indicating the magnitude and position of the payload 26A within the bed 118. The signals in the sensors 164-172 may be interpreted by the ECU 152 in a similar manner as previously described above for the corresponding sensor 48 of the wheel loader 10 in determining the weight distribution and torque distribution.

The magnitude of the X and Y weight components is determined based on the grade angle $\theta_G$ in a manner commonly known to those skilled in the art. The truck grade sensor 174 may be, for example, an inclinometer capable of detecting rotation about a line parallel to the Z-axis to measure the grade angle $\theta_G$ over which the dump truck 100 is traveling. The truck grade sensor 174 transmits a signal indicative of the grade angle $\theta_G$ to the ECU 152, and the ECU 152 calculates the values of the weight components for the various masses to be used in equilibrium equations (1)-(3). The parallel weight components used in equilibrium equation (1) act in the same direction as the powertrain forces $P_i$ and in the opposite direction as the ground reactant forces $G_i$. Consequently, the ground reactant forces G required to maintain equilibrium may be greater and the likelihood of wheel slippage increases.

The weight components normal to the graded surface 190 are used in equilibrium equation (2) and necessarily have magnitudes less than the corresponding weights $W_i$. As result, the sum of the normal forces $N_i$ decreases as the grade angle $\theta_G$ increases. Correspondingly, the maximum possible ground reactant forces $G_i$ decrease so that the likelihood of wheel slippage increases and the ECU 152 will cause the torque transfer unit 128 to transfer torque from the powertrain 108 to the front wheels 110 and the rear wheels 112, 114 as necessary to avoid having the wheels slip. Equilibrium equation (3) also changes as the grade angle $\theta_G$ changes. The moment arms about an origin O located at the point of contact between the front wheels 110 and the graded surface 190 increase for the centers of gravity $CG_{TF}$, $CG_{RA1}$, $CG_{RA2}$, $CG_B$, $CG_P$, and decrease for the center of gravity $CG_{TP}$. A moment arm exists for the center of gravity $CG_{FA}$ that acts through the origin O and creates no moment about the origin O when the dump truck 100 is on a level surface. The signal from the truck grade sensor 174 allows the ECU 152 to determine the grade angle $\theta_G$ and calculate the moment arms for the centers of gravity $CG_i$ for use in solving the equilibrium equations (1)-(3). In general, though, the uphill grade increases the clockwise moments about the origin O and increases the normal forces $N_i$ exerted on the rear wheels 112, 114 by the graded surface 190 so that the ECU 152 will cause the torque transfer unit 128 to increase the torque transmitted to the rear wheels 112, 114 and reduce the torque to the front wheels 110.

FIG. 16 illustrates the dump truck 100 driving down the graded surface 190 having the grade angle $\theta_G$. As the dump truck 100 drives down the graded surface 190, the truck grade sensor 174 transmits signals to the ECU 152 indicative of the downhill grade angle $\theta_G$. In response, the ECU 152 calculates the components of the weights $W_i$ of the centers of gravity $CG_i$ acting parallel and perpendicular to the graded surface 190, and the moments created by the components about the origin O. The weights $W_i$ will have parallel weight components $W_{iP}$ acting in the opposite direction on the graded surface 190 as the powertrain forces $F_i$ when the dump truck 100 is driven forward down the graded surface 190. Consequently, the ground reactant forces $G_i$ may be less travelling down the graded surface 190 than traveling up the graded surface 190 or over a flat surface as determined by the equilibrium equation (1). The normal weight components $W_{iN}$ of the weights $W_i$ will be less than the total weights $W_i$ on a flat surface, and the equilibrium equation (2) will yield normal forces $N_i$ having a smaller total value when summed to equal the normal weight components $W_{iN}$. The moment arms for the weights $W_i$ change such that the clockwise moments about the origin O are less than on a flat surface, and counterclockwise moments are created by the parallel weight components $W_{iP}$ so that the normal forces $N_{FL}$, $N_{FR}$ on the front wheels 110 increase and the normal forces $N_{FR1L}$, $N_{FR2R}$, $N_{FR2L}$, $N_{FR2R}$ on the rear wheels 112, 114 decrease. In response, the ECU 152 causes the torque transfer unit 128 to increase the portion of the torque from the powertrain 108 directed to the front wheels 110.

Figure 17:
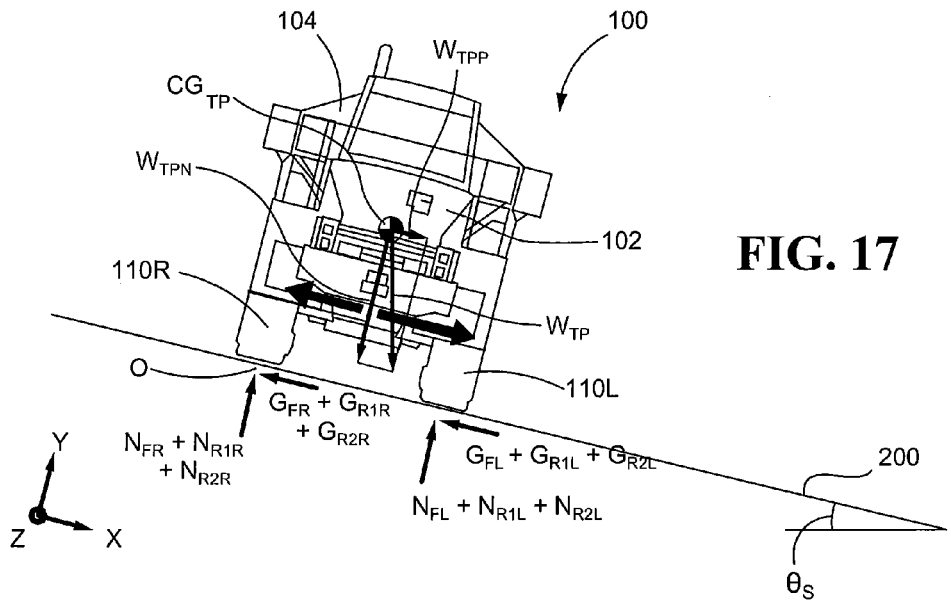
FIG. 17 is a schematic illustration of the articulated dump truck of FIG. 5 traveling on a side hill grade with the left side lower than the right side.
Figure 18:
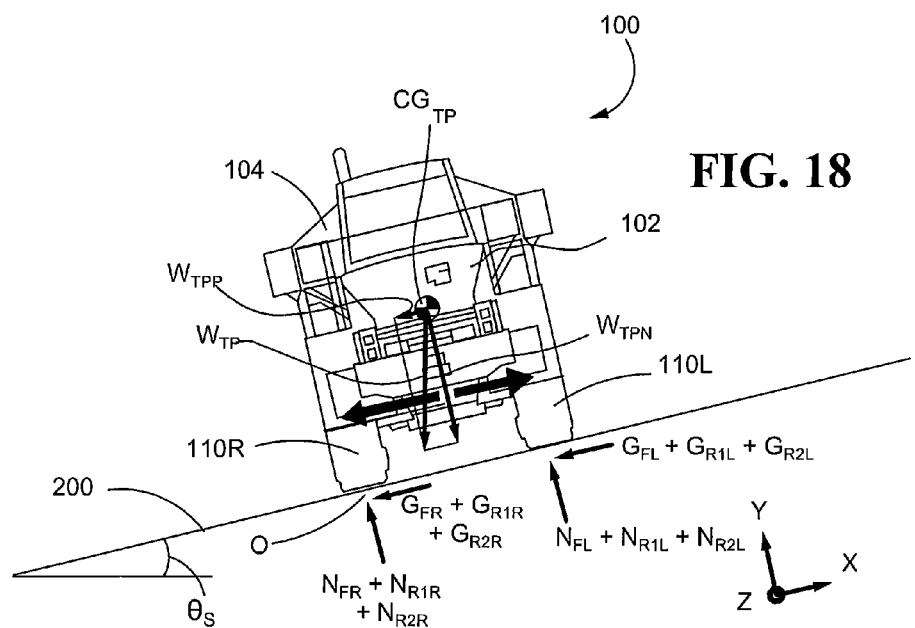
FIG. 18 is schematic illustration of the articulated dump truck of FIG. 5 traveling on a side hill grade with the right side lower than the left side.

In FIGS. 17 and 18, the dump truck 100 is driving over a sloped surface 200 such that the left wheels 110L, 112L, 114L (FIG. 17) or the right wheels 110R, 112R, 114R (FIG. 18) are lower than the opposite wheels 110, 112, 114. The truck slope sensor 176 may transmit signals to the ECU 152 indicative of a value of a side hill slope angle $\theta_S$ of the sloped surface 200 so that the ECU 152 can calculate the normal weight components $W_{iN}$ and parallel weight components $W_{iP}$ of the centers of gravity $CG_i$ relative to the sloped surface 200 as shown, for example, for the center of gravity $CG_{TP}$ of the tractor portion 102 in a similar manner as with the grade angle $\theta_G$ shown in FIGS. 15 and 16 and discussed above. The ECU 152 then solves the equilibrium equations (1)-(3) to determine the values of the normal forces $N_i$ and ground reactant forces $G_i$, and the corresponding torque distribution between the left and right wheels 110, 112, 114. As with the graded surface 190 example, the down slope wheels 110, 112, 114 will bear a greater portion of the weights Wi and normal forces Ni from the sloped surface 200 due to the changes to the moments about the origin O in equilibrium equation (3). Thus, the ECU 152 will cause the differentials 132, 144, 148 to transfer a greater portion of the torque from the powertrain 108 to the left wheels 110L, 112L, 114L as indicated by the arrows in FIG. 17, and to the right wheels 110R, 112R, 114R as indicated by the arrows in FIG. 18 to prevent slipping by the up slope wheels 110, 112, 114.

As discussed throughout the examples provided herein, the improved efficiency in allocating the powertrain torque among the wheels of the work machines reduces slippage and instability during the operation of the work machines. By directing more of the powertrain torque to the wheels bearing greater portions of the weight of the work machine and the payload of work material, and correspondingly less torque to the remaining wheels, the overall powertrain torque required to perform the operations of the work machine may be reduced. In some implementations, use of the drive train torque vectoring strategy may allow for downsizing the engine of the work machine, as the smaller engine may be capable of generating sufficient powertrain torque to perform the operations of the work machine when the torque is efficient distributed among the wheels.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A machine, comprising:
   a powertrain drivingly connected to at least one left front wheel, at least one right front wheel, at least one left rear wheel, and at least one right rear wheel through a torque transfer unit, the torque transfer unit configured to transfer torque to the front wheels as a function of a desired front torque, and to transfer a different torque to the rear wheels as a function of a desired rear torque, wherein the powertrain is drivingly connected to the front wheels through a front differential and to the rear wheels through a rear differential, the front and rear differentials configured to transfer torque to the left wheels as a function of a desired left torque, and to transfer a different torque to the right wheels as a function of a desired Light torque;
   at least one sensor configured to detect a value of an operating parameter of the machine that is indicative of a distribution of a weight of the machine across the left and right front and rear wheels of the machine, and to generate a parameter signal corresponding to the value of the operating parameter; and
   a control unit configured to determine the weight distribution of the machine across the left and right front and rear wheels of the machine as a function of the parameter signal and to determine the desired front torque and the desired rear torque as a function of the weight distribution, and wherein the control unit is configured to determine the desired left torque and the desired right torque as a function of the weight distribution.

2. The machine of claim 1, comprising:
   a linkage supporting a load of material; and
   an actuator for moving the linkage to position the load of material at a desired location,
   wherein the at least one sensor comprises a load weight sensor operatively connected to the actuator and the value of the operating parameter is a load weight value detected from the actuator, and
   wherein the control unit is configured to recalculate the weight distribution of the machine based on the load weight value and to recalculate the desired front torque and the desired rear torque based on the recalculated weight distribution of the machine.

3. The machine of claim 2, wherein the actuator comprises a hydraulic cylinder and the load weight value comprises a pressure value of the hydraulic cylinder.

4. The machine of claim 1, comprising a linkage configured to position a load of material at a desired location, wherein the at least one sensor comprises a load position sensor operatively connected to the linkage and the value of the operating parameter is a linkage position, and wherein the control unit is configured to determine the location of the load of material based on the linkage position transmitted in the parameter signal, to recalculate the weight distribution of the machine based on the location of the load of material, and to recalculate the desired front torque and the desired rear torque based on the recalculated weight distribution of the machine.

5. The machine of claim 1, wherein the at least one sensor is a machine orientation sensor and the value of the operating parameter is an orientation of the machine with respect to a coordinate system, and wherein the control unit is configured to recalculate the weight distribution of the machine based on the orientation of the machine, and to recalculate the desired front torque and the desired rear torque based on the recalculated distribution of the weight of the machine.

6. A method for distributing a powertrain drive torque from a powertrain of a machine to left and right front and rear wheels of the machine based on a distribution of a weight of the machine across the left and right front and rear wheels, comprising:

detecting via at least one sensor of the machine a value of an operating parameter of the machine that is indicative of the distribution of the weight of the machine across the left and right front and rear wheels of the machine;
    determining the distribution of the weight of the machine across the left and right front and rear wheels of the machine based on the value of the operating parameter;
    distributing the powertrain drive torque from the powertrain of the machine between the front wheels and the rear wheels of the machine based on the distribution of the weight of the machine, with a portion of the powertrain drive torque transmitted to the front wheels being greater than a portion of the powertrain drive torque transmitted to the rear wheels if a portion of the weight of the machine over the front wheels is greater than a portion of the weight of the machine over the rear wheels, and with the portion of the powertrain drive torque transmitted to the rear wheels being greater than the portion of the powertrain drive torque transmitted to the front wheels if the portion of the weight of the machine over the rear wheels is greater than the portion of the weight of the machine over the front wheels; and
    distributing the powertrain drive torque from the powertrain of the machine between the left wheels and the right wheels of the machine based on the distribution of the weight of the machine, with a portion of the powertrain drive torque transmitted to the left wheels being greater than a portion of the powertrain drive torque transmitted to the right wheels if a portion of the weight of the machine over the left wheels is greater than a portion of the weight of the machine over the right wheels, and with the portion of the powertrain drive torque transmitted to the right wheels being greater than the portion of the powertrain drive torque transmitted to the left wheels if the portion of the weight of the machine over the right wheels is greater than the portion of the weight of the machine over the left wheels.

7. The method of claim 6, wherein the value of the operating parameter is a load weight value for a load of material transported by the machine, the method comprising:
    recalculating the distribution of the weight of the machine based on the load weight value; and
    distributing the powertrain drive torque between the front wheels and the rear wheels of the machine based on the recalculated distribution of the weight of the machine based on the load weight value.

8. The method of claim 7, wherein the machine comprises a linkage supporting the load of material and a hydraulic cylinder for moving the linkage to position the load of material at a desired location, and wherein detecting the value of the operating parameter comprises detecting a pressure of the hydraulic cylinder.

9. The method of claim 6, wherein the value of the operating parameter is a load position for a load of material transported by the machine, the method comprising:
    recalculating the distribution of the weight of the machine based on the load position of the load of material; and
    distributing the powertrain drive torque between the front wheels and the rear wheels of the machine based on the recalculated distribution of the weight of the machine based on the load position of the load of material.

10. The method of claim 6, wherein the value of the operating parameter is a machine orientation indicating an orientation of the machine with respect to a coordinate system, the method comprising:
    recalculating the distribution of the weight of the machine based on the machine orientation; and
    distributing the powertrain drive torque between the front wheels and the rear wheels of the machine based on the recalculated distribution of the weight of the machine based on the machine orientation.

11. A machine for transporting a load of material, comprising:
    a left front wheel;
    a right front wheel;
    a left rear wheel;
    a right rear wheel;
    a powertrain operatively connected to the left front wheel, the right front wheel, the left rear wheel and the right rear wheel, the powertrain operable for generating a powertrain drive torque and outputting the powertrain drive torque to the left and right front and rear wheels;
    at least one sensor for detecting a value of an operating parameter of the machine that is indicative of a distribution of a weight of the machine across the left and right front and rear wheels of the machine, and for outputting a sensor signal corresponding to the value of the operating parameter; and
    a control unit operatively connected to the powertrain and the at least one sensor,
        the control unit configured to receive the sensor signal from the at least one sensor,
        the control unit configured to determine the distribution of the weight of the machine across the left and right front and rear wheels of the machine based on the value of the operating parameter in the sensor signal, and
        the control unit configured to transmit a torque distribution signal to the powertrain to cause the powertrain to output the powertrain drive torque to the left and right front and rear wheels, with a portion of the powertrain drive torque transmitted to the front wheels being greater than a portion of the powertrain drive torque transmitted to the rear wheels if a portion of the weight of the machine over the front wheels is greater than a portion of the weight of the machine over the rear wheels, and with the portion of the powertrain drive torque transmitted to the rear wheels being greater than the portion of the powertrain drive torque transmitted to the front wheels if the portion of the weight of the machine over the rear wheels is greater than the portion of the weight of the machine over the front wheels, wherein a portion of the powertrain drive torque transmitted to the left wheels is greater than a portion of the powertrain drive torque transmitted to the right wheels if a portion of the weight of the machine over the left wheels is greater than a portion of the weight of the machine over the right wheels, and wherein the portion of the powertrain drive torque transmitted to the right wheels is greater than a portion of the powertrain drive torque transmitted to the left wheels if the portion of the weight of the machine over the right wheels is greater than the portion of the weight of the machine over the left wheels.

12. The machine of claim 11, comprising:
    a linkage supporting the load of material; and
    an actuator for moving the linkage to position the load of material at a desired location, wherein the at least one sensor comprises a load weight sensor operatively connected to the actuator and the value of the operating parameter is a load weight value detected from the actuator, and wherein the control unit is configured to recalculate the distribution of the weight of the machine based on the load weight value and to transmit a new torque distribution signal to the powertrain based on the recalculated distribution of the weight of the machine.

13. The machine of claim 12, wherein the actuator comprises a hydraulic cylinder and the load weight value comprises a pressure value of the hydraulic cylinder.

14. The machine of claim 11, comprising a linkage configured to position the load of material at a desired location, wherein the at least one sensor comprises a load position sensor operatively connected to the linkage and the value of the operating parameter is a linkage position, and wherein the control unit is configured to determine the location of the load of material based on the linkage position transmitted in the sensor signal, to recalculate the distribution of the weight of the machine based on the location of the load of material, and to transmit a new torque distribution signal to the powertrain based on the recalculated distribution of the weight of the machine.

15. The machine of claim 11, wherein the at least one sensor is a machine orientation sensor and the value of the operating parameter is an orientation of the machine with respect to a coordinate system, and wherein the control unit is configured to recalculate the distribution of the weight of the machine based on the orientation of the machine, and to transmit a new torque distribution signal to the powertrain to distribute the powertrain drive torque between the left and right front and rear wheels based on the recalculated distribution of the weight of the machine.

16. A machine, comprising:
a powertrain drivingly connected to at least one left front wheel, at least one right front wheel, at least one left rear wheel, and at least one right rear wheel through a torque transfer unit, the torque transfer unit configured to transfer torque to the front wheels as a function of a desired front torque, and to transfer a different torque to the rear wheels as a function of a desired rear torque;
at least one sensor configured to detect a value of an operating parameter of the machine that is indicative of a distribution of a weight of the machine across the left and right front and rear wheels of the machine, and to generate a parameter signal corresponding to the value of the operating parameter, wherein the at least one sensor comprises a machine speed sensor and the value of the operating parameter is a machine speed; and
a control unit configured to determine the weight distribution of the machine across the left and right front and rear wheels of the machine as a function of the parameter signal and to determine the desired front torque and the desired rear torque as a function of the weight distribution, and wherein the control unit is configured to determine a rate of change of the machine speed and a direction of the rate of change from the parameter signal, to recalculate the weight distribution of the machine based on the rate of change and the direction of the rate of change, and to recalculate the desired front torque and the desired rear torque based on the recalculated weight distribution, wherein the desired rear torque increases when the direction of the rate of change of the machine speed is in a forward direction and the desire front torque increases when the direction of the rate of change of the machine speed is in a reverse direction.

17. A method for distributing a powertrain drive torque from a powertrain of a machine to left and right front and rear wheels of the machine based on a distribution of a weight of the machine across the left and right front and rear wheels, comprising:
detecting via at least one sensor of the machine a value of an operating parameter of the machine that is indicative of the distribution of the weight of the machine across the left and right front and rear wheels of the machine, wherein the value of the operating parameter is a machine speed;
determining the distribution of the weight of the machine across the left and right front and rear wheels of the machine based on the value of the operating parameter, wherein determining the distribution of the weight of the machine comprises determining a rate of change of the machine speed and a direction of the rate of change based on the machine speed;
distributing the powertrain drive torque from the powertrain of the machine between the front wheels and the rear wheels of the machine based on the distribution of the weight of the machine, with a portion of the powertrain drive torque transmitted to the front wheels being greater than a portion of the powertrain drive torque transmitted to the rear wheels if a portion of the weight of the machine over the front wheels is greater than a portion of the weight of the machine over the rear wheels, and with the portion of the powertrain drive torque transmitted to the rear wheels being greater than the portion of the powertrain drive torque transmitted to the front wheels if the portion of the weight of the machine over the rear wheels is greater than the portion of the weight of the machine over the front wheels,
recalculating the distribution of the weight of the machine based on the rate of change and the direction of the rate of change, wherein the portion of the weight of the machine over the front wheels increases when the direction of the rate of change of the machine speed is in a reverse direction, and the portion of the weight of the machine over the rear wheels increases when the direction of the rate of change of the machine speed is in a forward direction; and
distributing the powertrain drive torque between the front wheels and the rear wheels of the machine based on the recalculated distribution of the weight of the machine.

18. A machine for transporting a load of material, comprising:
a left front wheel;
a right front wheel;
a left rear wheel;
a right rear wheel;
a powertrain operatively connected to the left front wheel, the right front wheel, the left rear wheel and the right rear wheel, the powertrain operable for generating a powertrain drive torque and outputting the powertrain drive torque to the left and right front and rear wheels;
at least one sensor for detecting a value of an operating parameter of the machine that is indicative of a distribution of a weight of the machine across the left and right front and rear wheels of the machine, and for outputting a sensor signal corresponding to the value of the operating parameter, wherein the at least one sensor comprises a machine speed sensor and the value of the operating parameter is a machine speed; and
a control unit operatively connected to the powertrain and the at least one sensor, the control unit configured to receive the sensor signal from the at least one sensor, the control unit configured to determine the distribution of the weight of the machine across the left and right front and rear wheels of the machine based on the value of the operating parameter in the sensor signal, and the control unit configured to transmit a torque distribution signal to the powertrain to cause the powertrain to output the powertrain drive torque to the left and right front and rear wheels, with a portion of the powertrain drive torque transmitted to the front wheels being greater than a portion of the powertrain drive torque transmitted to the rear wheels if a portion of the weight of the machine over the front wheels is greater than a portion of the weight of the machine over the rear wheels, and with the portion of the powertrain drive torque transmitted to the rear wheels being greater than the portion of the powertrain drive torque transmitted to the front wheels if the portion of the weight of the machine over the rear wheels is greater than the portion of the weight of the machine over the front wheels, the control unit is configured to determine a rate of change of the machine speed and a direction of the rate of change from the sensor signal, the control unit is configured to recalculate the distribution of the weight of the machine based on the rate of change and the direction of the rate of change, and the control unit is configured to transmit the torque distribution signal to the powertrain, wherein the portion of the powertrain drive torque transmitted to the rear wheels increases when the direction of the rate of change of the machine speed is in a forward direction and the portion of the powertrain drive torque transmitted to the front wheels increases when the direction of the rate of change of the machine speed is in a reverse direction.

* * * * *

UNITED STATES PATENT AND TRADEMARK OFFICE
CERTIFICATE OF CORRECTION

| | | |
|---|---|---|
| PATENT NO. | : 8,825,314 B2 | Page 1 of 1 |
| APPLICATION NO. | : 13/563315 | |
| DATED | : September 2, 2014 | |
| INVENTOR(S) | : Jeffrey Edward Jensen | |

It is certified that error appears in the above-identified patent and that said Letters Patent is hereby corrected as shown below:

On the Title Page, Item (75) the Inventor should read:
"Jeffrey Edward Jensen, Dunlap, IL (US)"

Signed and Sealed this
Ninth Day of December, 2014

Michelle K. Lee
*Deputy Director of the United States Patent and Trademark Office*